US012581041B2

(12) United States Patent
Hayashi

(10) Patent No.: US 12,581,041 B2
(45) Date of Patent: Mar. 17, 2026

(54) INFORMATION PROCESSING APPARATUS, INFORMATION PROCESSING METHOD, PROGRAM, AND INFORMATION COLLECTION SYSTEM

(71) Applicant: FUJIFILM Corporation, Tokyo (JP)

(72) Inventor: Shinji Hayashi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 418 days.

(21) Appl. No.: 18/188,873

(22) Filed: Mar. 23, 2023

(65) Prior Publication Data

US 2023/0247181 A1 Aug. 3, 2023

Related U.S. Application Data

(63) Continuation of application No. PCT/JP2021/034133, filed on Sep. 16, 2021.

(30) Foreign Application Priority Data

Oct. 1, 2020 (JP) ................................. 2020-167015

(51) Int. Cl.
| | |
|---|---|
| *H04N 7/18* | (2006.01) |
| *G06V 20/10* | (2022.01) |
| *H04N 23/661* | (2023.01) |

(52) U.S. Cl.
CPC ........... *H04N 7/181* (2013.01); *G06V 20/176* (2022.01); *H04N 23/661* (2023.01)

(58) Field of Classification Search
CPC ...... H04N 7/181; H04N 23/661; H04N 7/183; G06V 20/176; G06V 10/26; G06V 10/761
See application file for complete search history.

(56) References Cited

U.S. PATENT DOCUMENTS

| | | | |
|---|---|---|---|
| 2016/0321791 A1* | 11/2016 | Cabrera-Cordon | ..... G06F 16/29 |
| 2019/0364249 A1* | 11/2019 | Yamagaki | ............ H04N 21/654 |

FOREIGN PATENT DOCUMENTS

| | | |
|---|---|---|
| JP | 2012-026848 A | 2/2012 |
| WO | 2018/116485 A1 | 6/2018 |

OTHER PUBLICATIONS

International Search Report issued in PCT/JP2021/034133; mailed Nov. 30, 2021.

(Continued)

*Primary Examiner* — Jennifer Mehmood
*Assistant Examiner* — Dustin Bilodeau
(74) *Attorney, Agent, or Firm* — Studebaker Brackett PLLC

(57) ABSTRACT

A processor included in the information processing apparatus executes an acquisition process of acquiring a bird's-eye view image captured by a fixed camera, an extraction process of individually extracting an image that is estimated to be a building from the bird's-eye view image, a specifying process of specifying an unimaged building that is not captured in the bird's-eye view image among buildings included in map information in which the buildings and their addresses are associated with each other based on the basis of the extracted image, and an imaging request process of transmitting, among a plurality of terminals having an imaging function and a function of transmitting position information, request information for requesting imaging of the unimaged building to a terminal that is determined as being present in the vicinity of the unimaged building on the basis of the position information.

10 Claims, 18 Drawing Sheets

(56)          References Cited

OTHER PUBLICATIONS

International Preliminary Report On Patentability (Chapter I) and Written Opinion of the International Searching Authority issued in PCT/JP2021/034133; issued Mar. 28, 2023.

Motegi, Manabu et al., The estimation of the damages of disaster using multi-camera images, Preprints of the 26th annual conference of the Robotics Society of Japan, Sep. 9, 2008, pp. 1-2.

Fujita, Shono et al., Estimation Method of Roof-Injured Buildings From Aero Photo Images Using Deep Learning in Earthquake Disaster, Information Systems of IPSJ Technical Report, Nov. 24, 2019, vol. 2019-IS-150, No. 10, pp. 1-6.

* cited by examiner

FIG. 1

INFORMATION PROCESSING SERVER — 10

- CPU — 101
- MEMORY — 102
- 105
- STORAGE — 103
  - OPERATION PROGRAM — 106
- COMMUNICATION UNIT — 104

MOBILE TERMINAL — 30

- CPU — 301
- MEMORY — 302
- INPUT UNIT — 303
- COMMUNICATION UNIT — 308
- 309
- DISPLAY UNIT — 304
- CAMERA UNIT — 305
- POSITION INFORMATION ACQUISITION UNIT — 306
- SPEAKER UNIT — 307

LONGITUDE

PO

LATITUDE

PO

EXTRACT

NISIAZABU 2-1-2

PE

NOT CAPTURED DUE TO BEING BLOCKED BY FOREGROUND BUILDING

UNIMAGED BUILDING INFORMATION

NS

M

NISIAZABU POST OFFICE

NISIAZABU POLICE OFFICE
NISIAZABU POLICE BOX

CARDIOVASCULAR INST

NISIAZABU 3-CHOME

TOKYO REGIONAL TAXATION BUREAU

COORDINATE CONVERSION

FIG. 10

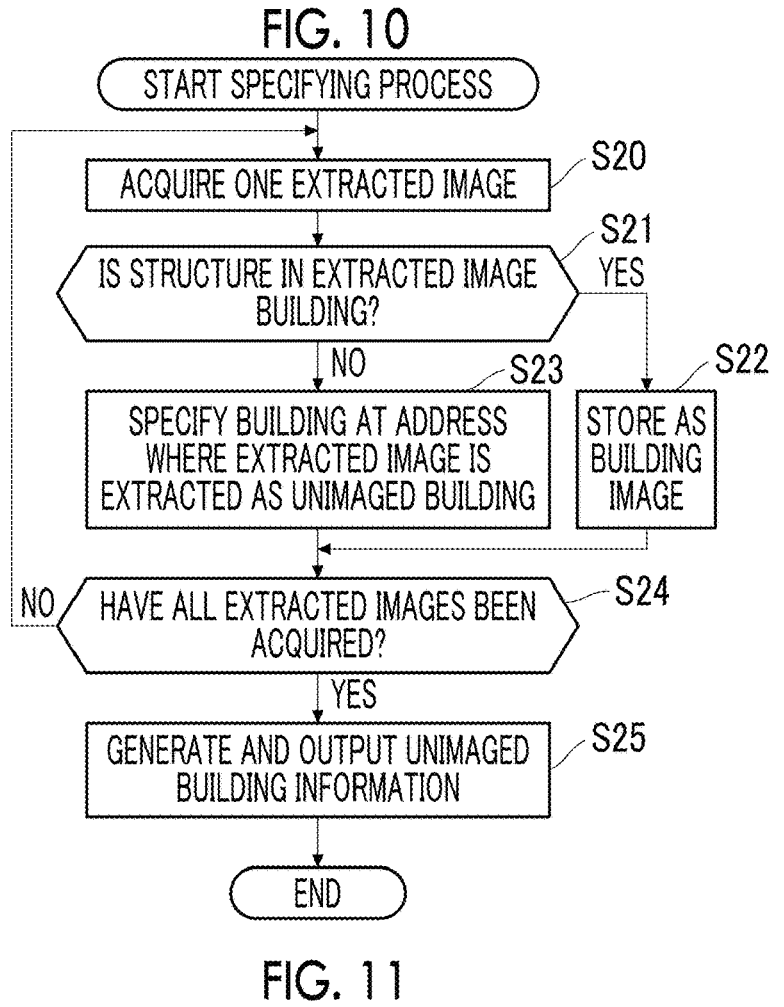

START SPECIFYING PROCESS

ACQUIRE ONE EXTRACTED IMAGE — S20

IS STRUCTURE IN EXTRACTED IMAGE BUILDING? — S21

YES

NO — S23

SPECIFY BUILDING AT ADDRESS WHERE EXTRACTED IMAGE IS EXTRACTED AS UNIMAGED BUILDING

STORE AS BUILDING IMAGE — S22

HAVE ALL EXTRACTED IMAGES BEEN ACQUIRED? — S24

NO

YES

GENERATE AND OUTPUT UNIMAGED BUILDING INFORMATION — S25

END

FIG. 11

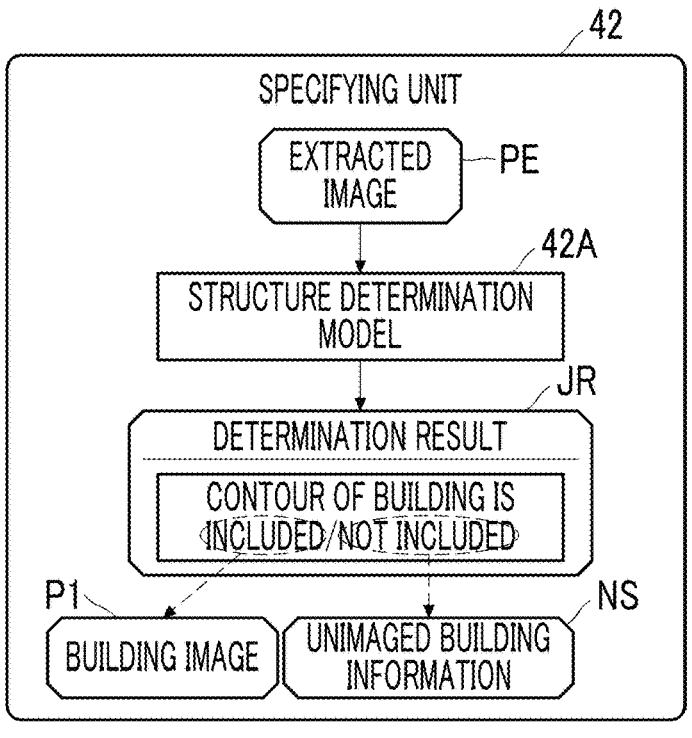

42

SPECIFYING UNIT

EXTRACTED IMAGE — PE

STRUCTURE DETERMINATION MODEL — 42A

DETERMINATION RESULT — JR

CONTOUR OF BUILDING IS INCLUDED/NOT INCLUDED

P1 — BUILDING IMAGE

UNIMAGED BUILDING INFORMATION — NS

PL        CA

TD

```
┌ ─ ─ ─ ─ ─ ─ ─ ─ ─ ─ ─ ─ ─ ─ ─ ─ ─ ─ ─ ─ ┐
  ( LEARNING IMAGE )   ( CORRECT ANSWER DATA )
└ ─ ─ ─ ─ ─ ─ ─ ─ ─ ─ ─ ─ ─ ─ ─ ─ ─ ─ ─ ─ ┘
```

42A

STRUCTURE DETERMINATION MODEL ← UPDATE SETTING ← LOSS CALCULATION

JR

DETERMINATION RESULT

NS

50

50

M

50

NISIAZABU POST OFFICE

NISIAZABU POLICE OFFICE
NISIAZABU POLICE BOX

CARDIOVASCULAR INST.

NISIAZABU 3-CHOME

TOKYO REGIONAL TAXATION BUREAU

START IMAGING REQUEST PROCESS

ACQUIRE UNIMAGED BUILDING INFORMATION — S30

ACQUIRE POSITION INFORMATION FROM MOBILE TERMINAL — S31

DETECT MOBILE TERMINAL PRESENT IN VICINITY OF UNIMAGED BUILDING — S32

GENERATE REQUEST INFORMATION — S33

TRANSMIT REQUEST INFORMATION TO DETECTED MOBILE TERMINAL — S34

END

START EXTRACTION PROCESS

↓

ACQUIRE BIRD'S-EYE VIEW IMAGE  S40

↓

PERFORM SEARCH ACCORDING TO
SLIDING WINDOW METHOD  S41

↓

EXTRACT OBJECT HAVING
CHARACTERISTICS OF BUILDING AS
EXTRACTED IMAGE  S42

↓

END

INFORMATION PROCESSING APPARATUS, INFORMATION PROCESSING METHOD, PROGRAM, AND INFORMATION COLLECTION SYSTEM

CROSS-REFERENCE TO RELATED APPLICATION

This application is a continuation application of International Application No. PCT/JP2021/034133, filed Sep. 16, 2021, the disclosure of which is incorporated herein by reference in its entirety. Further, this application claims priority from Japanese Patent Application No. 2020-167015 filed on Oct. 1, 2020, the disclosure of which is incorporated herein by reference in its entirety.

BACKGROUND

1. Technical Field

The technology of the present disclosure relates to an information processing apparatus, an information processing method, a program, and an information collection system.

2. Description of the Related Art

In the event of a large-scale disaster, a local government needs to quickly ascertain a damage status in order to minimize the damage in a disaster area and to support livelihoods of residents. In recent years, a damage status has been ascertained on the basis of a bird's-eye view image captured by a fixed camera installed on an aircraft, a drone, a rooftop of a tall building, or the like.

Since it takes time for an aircraft or a drone to arrive at a disaster site, it is not possible to quickly ascertain a damage status. In a case of capturing an image with an aircraft or a drone, since a distance to a building is long, it is difficult to ascertain a detailed damage status of each building. On the other hand, in a case of capturing an image with a fixed camera installed on a rooftop of a tall building or the like, since a distance to a building is relatively short, it is possible to ascertain a detailed damage status of each building. However, since it is not possible to image blind spots of tall buildings, ascertaining of a damage status is limited to a restricted range.

As a related technology, there is a technology in which, among surveillance target areas in which a plurality of surveillance cameras are installed, a range of a certain distance from the place where a disaster such as a fire occurs is determined as an imaging request area, and a request for imaging of the imaging request area is made to a person who is present in the vicinity (refer to WO2018/116485A).

SUMMARY

However, the technology described in WO2018/116485A is intended to ascertain a status of a relatively rough area such as an imaging request area, and is not intended to ascertain a damage status of each building. In a case where a damage status is ascertained at the time of a disaster, it is necessary to acquire a damage status of each building.

In particular, in a case where a damage status of a disaster area is ascertained by using a fixed camera installed on a rooftop of a tall building, for example, it is necessary to ascertain a damage status of a building that is not captured in a bird's-eye view image due to being present in a blind spot of another building.

An object of the technology of the present disclosure is to provide an information processing apparatus, an information processing method, a program, and an information collection system that can quickly ascertain a damage status of a building that is not captured in a bird's-eye view image captured by a fixed camera.

In order to achieve the above object, according to the present disclosure, there is provided an information processing apparatus including a processor; and a memory connected to or built into the processor, in which the processor executes an acquisition process of acquiring a bird's-eye view image captured by a fixed camera, an extraction process of individually extracting an image of a building from the bird's-eye view image, a specifying process of specifying an unimaged building that is not captured in the bird's-eye view image among buildings included in map information in which the extracted image extracted in the extraction process is associated with a building and an address, and an imaging request process of transmitting, among a plurality of terminals having an imaging function and a function of transmitting position information, request information for requesting imaging of the unimaged building to a terminal that is determined as being present in the vicinity of the unimaged building on the basis of the position information.

It is preferable that the processor, in the extraction process, converts coordinates representing an outer periphery of a building at each address included in the map information into coordinates on the bird's-eye view image, and extracts an image of the building on the basis of the converted coordinates, and, in the specifying process, determines whether or not a structure captured in the extracted image extracted through the extraction process is a building, and in a case where the structure is not a building, specifies a building at an address where the extracted image is extracted as an unimaged building.

It is preferable that, in the specifying process, the processor determines whether or not the structure captured in the extracted image is a building on the basis of a trained model that is trained by using training data indicating whether or not a structure is a building.

It is also preferable that the map information includes a polygon image representing a contour of a building, and, in the specifying process, the processor determines whether or not the structure captured in the extracted image is a building on the basis of a similarity between a contour of the structure captured in the extracted image and the polygon image corresponding to the extracted image.

It is also preferable that the processor, in the extraction process, extracts an image including an object having characteristics of a building is extracted from the bird's-eye view image as the extracted image, and associates the extracted image that has been extracted with an address included in the map information, and, in the specifying process, specifies a building at an address not associated with the extracted image as the unimaged building.

It is preferable that the request information includes a map indicating an address of the unimaged building.

It is preferable that the request information includes a sample image representing an example of an image to be captured.

According to the present disclosure, there is provided an information processing method including an acquisition process of acquiring a bird's-eye view image captured by a fixed camera; an extraction process of individually extracting an image of a building from the bird's-eye view image; a specifying process of specifying an unimaged building that is not captured in the bird's-eye view image among buildings included in map information in which the extracted image extracted in the extraction process is associated with a building and an address; and an imaging request process of transmitting, among a plurality of terminals having an imaging function and a function of transmitting position information, request information for requesting imaging of the unimaged building to a terminal that is determined as being present in the vicinity of the unimaged building on the basis of the position information.

According to the present disclosure, there is provided a program causing a computer to execute an acquisition process of acquiring a bird's-eye view image captured by a fixed camera; an extraction process of individually extracting an image of a building from the bird's-eye view image; a specifying process of specifying an unimaged building that is not captured in the bird's-eye view image among buildings included in map information in which the extracted image extracted in the extraction process is associated with a building and an address; and an imaging request process of transmitting, among a plurality of terminals having an imaging function and a function of transmitting position information, request information for requesting imaging of the unimaged building to a terminal that is determined as being present in the vicinity of the unimaged building on the basis of the position information.

According to the present disclosure, there is provided an information collection system including a fixed camera that captures a bird's-eye view image, an information processing apparatus that includes a processor; and a plurality of terminals having an imaging function and a function of transmitting position information, in which the processor is configured to execute an acquisition process of acquiring a bird's-eye view image captured by a fixed camera; an extraction process of individually extracting an image of a building from the bird's-eye view image; a specifying process of specifying an unimaged building that is not captured in the bird's-eye view image among buildings included in map information on the basis of the map information in which the extracted image extracted in the extraction process is associated with a building and an address; and an imaging request process of transmitting, among a plurality of terminals having an imaging function and a function of transmitting position information, request information for requesting imaging of the unimaged building to a terminal that is determined as being present in the vicinity of the unimaged building on the basis of the position information.

According to the technology of the present disclosure, it is possible to provide an information processing apparatus, an information processing method, a program, and an information collection system that can quickly ascertain a damage status of a building that is not captured in a bird's-eye view image captured by a fixed camera.

BRIEF DESCRIPTION OF THE DRAWINGS

Exemplary embodiments according to the technique of the present disclosure will be described in detail based on the following figures, wherein:

FIG. 1 is a diagram showing a configuration example of an information collection system according to a first embodiment, FIG. 10 is a flowchart for describing an example of a specifying process, FIG. 11 is a block diagram showing an example of a configuration of a specifying unit.

DETAILED DESCRIPTION

First Embodiment

Figure 1:
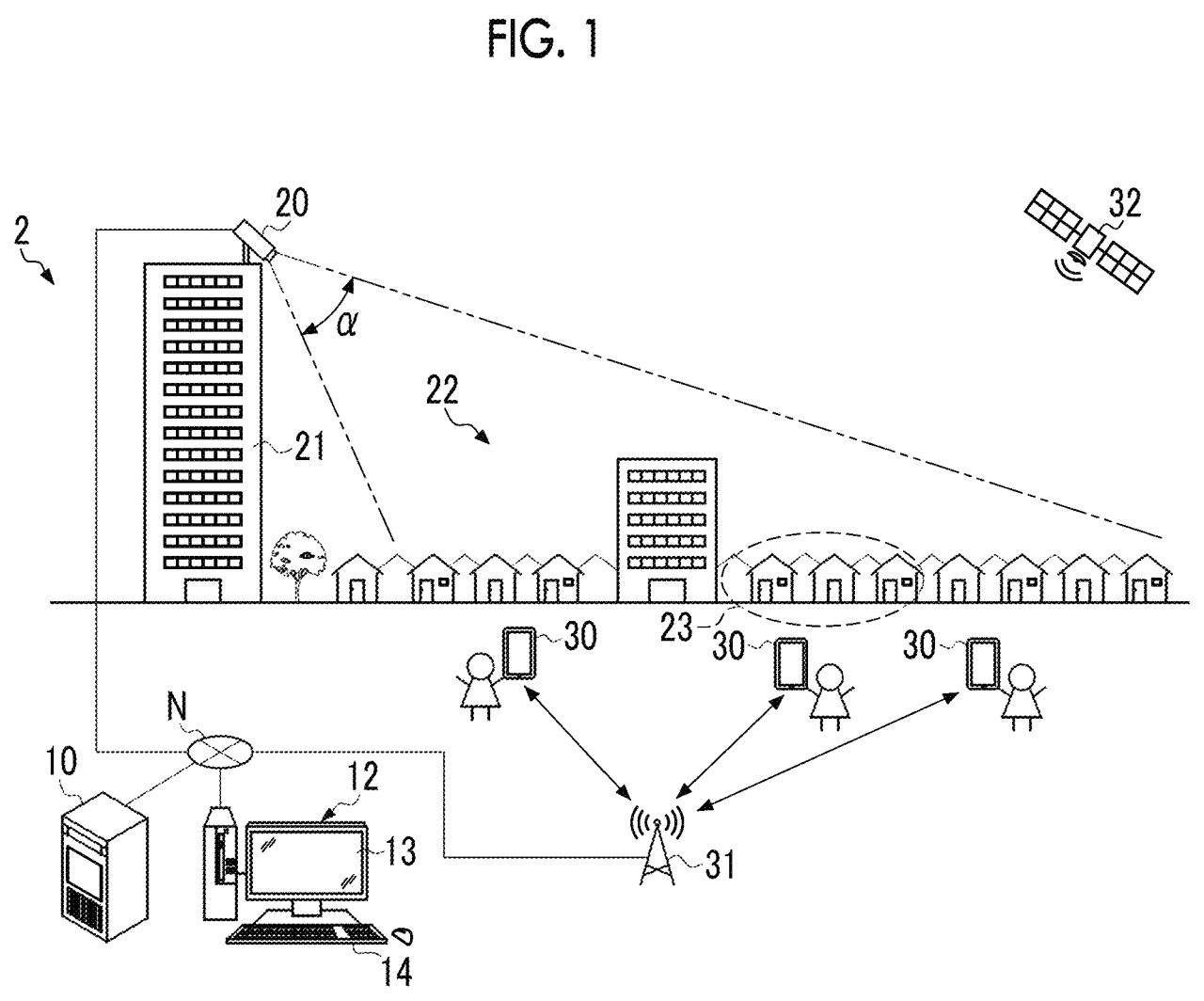
Figure 2:
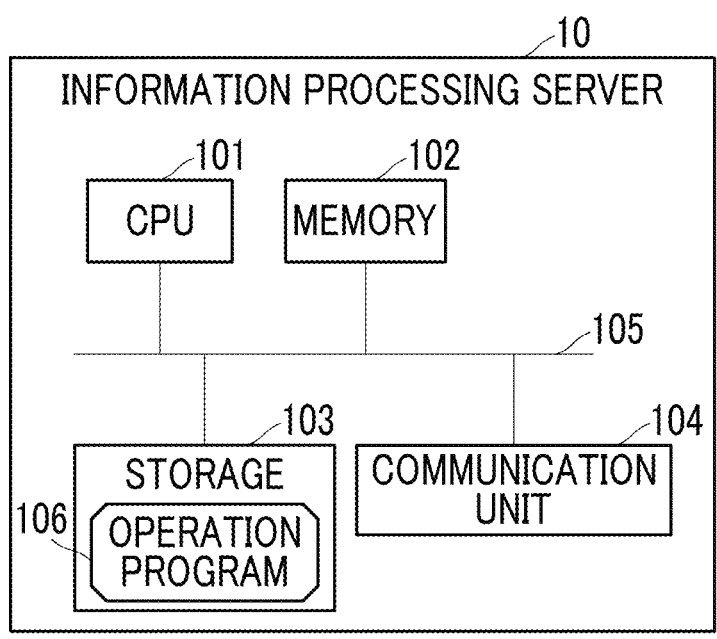
FIG. 2 is a block diagram showing an example of a configuration of an information processing server.

FIG. 1 is a diagram showing a configuration example of an information collection system according to a first embodiment of the present disclosure. An information collection system 2 includes an information processing server 10, a fixed camera 20, and a plurality of mobile terminals 30. In the information collection system 2, for example, in order for a local government to ascertain a damage status in a city area in the event of a disaster, the information collection system 2 collects images of individual buildings (hereinafter, referred to as building images). The buildings include various buildings such as a detached house, an apartment house, a store, and an office building.

The information processing server 10, the fixed camera 20, and the plurality of mobile terminals 30 are communicatively connected to each other via a network N. The network N is, for example, a wide area network (WAN) such as the Internet or a public communication network. In a case where a WAN is used, it is preferable to construct a virtual private network (VPN) or to use a communication protocol having a high security level such as Hypertext Transform Protocol Security (HTTPS) in consideration of information security.

The information processing server 10 is installed in, for example, a headquarters for disaster control (an agency, a government office, or the like) of a local government such as a prefecture or a municipality. The information processing server 10 is an example of an "information processing apparatus" according to the technology of the present disclosure.

A client terminal 12 is also connected to the network N by a wired system or a wireless system. The client terminal 12 is, for example, a desktop personal computer assigned to a staff member of the headquarters for disaster control and has a display 13 and an input device 14. Various screens are displayed on the display 13. The input device 14 is a keyboard, a mouse, a touch panel, a microphone, or the like. The client terminal 12 is operated by, for example, a staff member of the headquarters for disaster control. Although only one client terminal 12 is shown in FIG. 1, the number of client terminals 12 may be two or more.

The fixed camera 20 is installed on a rooftop of a tall building 21 to have a bird's-eye view of a city area 22. The fixed camera 20 is a digital camera that captures a still image in response to an imaging instruction from the client terminal 12. A bird's-eye view image of the city area 22 captured by the fixed camera 20 is transmitted to the information processing server 10 via the network N. The bird's-eye view image is an image including the area of the local government.

Although the fixed camera 20 is fixedly installed, the fixed camera 20 may be configured such that an imaging azimuth and an elevation angle can be changed. The fixed camera 20 may be configured such that an angle of view a can be changed.

The mobile terminal 30 is a portable electronic terminal such as a smartphone or a tablet terminal having an imaging function and a position information transmission function. The mobile terminal 30 is connected to the network N via a base station 31. The mobile terminal 30 transmits an image captured with the imaging function and position information acquired with a position information acquisition function to the information processing server 10 via the base station 31 and the network N. The mobile terminal 30 acquires position information, for example, by receiving radio waves transmitted from a global positioning system (GPS) satellite 32. The mobile terminal 30 is an example of a "terminal" according to the technology of the present disclosure.

The mobile terminal 30 is owned by, for example, a resident living in the city area 22. The information processing server 10 transmits request information for requesting imaging of an unimaged building to the mobile terminal 30 that is present in the vicinity of the unimaged building that is a building that is not captured in the bird's-eye view image among the plurality of mobile terminals 30. For example, the unimaged building is a building that is present in the blind spot 23 of a relatively tall building when viewed from the fixed camera 20 among buildings that are present in the city area 22.

The information processing server 10 specifies the mobile terminal 30 present in the vicinity of the unimaged building on the basis of the position information transmitted from each of the plurality of mobile terminals 30, and transmits the request information to the specified mobile terminal 30. The owner of the mobile terminal 30 images the unimaged building in accordance with the request information and transmits a captured image to the information processing server 10.

FIG. 2 shows an example of a configuration of the information processing server 10. The information processing server 10 is configured by a computer that has a central processing unit (CPU) 101, a memory 102, a storage 103, and a communication unit 104 and in which these constituents are connected to each other via a bus line 105. The CPU 101 is an example of a "processor" according to the technology of the present disclosure.

The storage 103 is a hard disk drive that is built into the computer that configures the information processing server 10 or is connected via a cable or a network. The storage 103 may be a disk array in which a plurality of hard disk drives are connected. The storage 103 stores a control program such as an operating system (OS), various application programs, various types of data associated with these programs, and the like. A solid state drive may be used instead of the hard disk drive.

The memory 102 is a work memory such as a random access memory (RAM) used for the CPU 101 to execute processing. The memory 102 is connected to or built into the CPU 101. The CPU 101 loads an operation program 106 stored in the storage 103 into the memory 102, and executes processing according to the operation program 106. Accordingly, the CPU 101 comprehensively controls an operation of each unit of the computer. The communication unit 104 controls transmission of various types of information to external devices such as the client terminal 12, the fixed camera 20, and the mobile terminal 30 via the network N.

Figure 3:
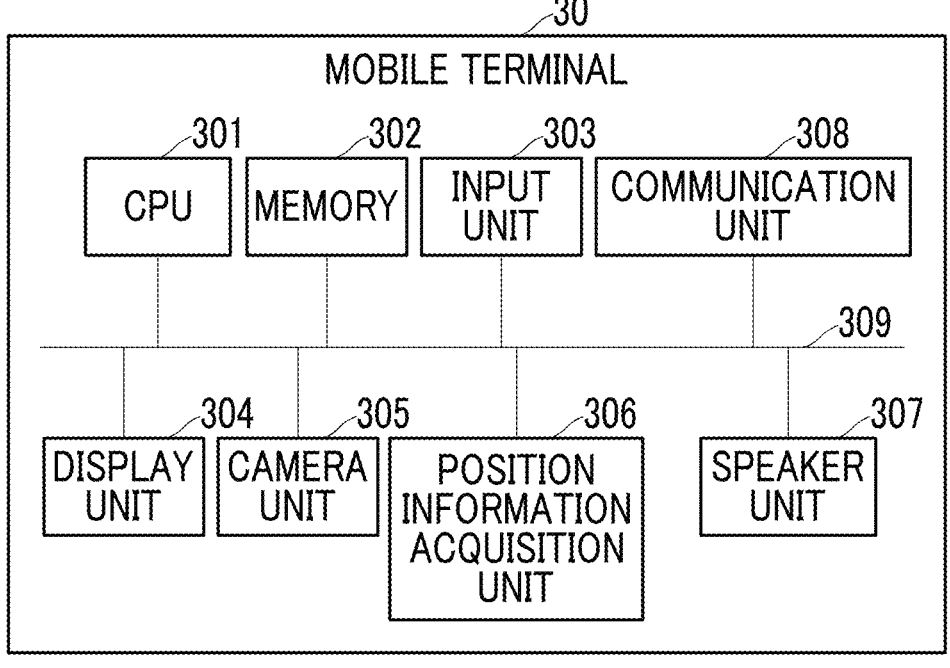
FIG. 3 is a block diagram showing an example of a configuration of a mobile terminal.

FIG. 3 shows an example of a configuration of the mobile terminal 30. The mobile terminal 30 has a configuration of a general computer. The mobile terminal 30 includes, for example, a CPU 301, a memory 302, an input unit 303, a display unit 304, a camera unit 305, a position information acquisition unit 306, a speaker unit 307, a communication unit 308, and a bus line 309.

The CPU 301 realizes each function of the mobile terminal 30 by reading out a program and data stored in the memory 302 and executing processing. The memory 302 stores an OS, an application program, image data, various types of data, and the like.

The input unit 303 is an input device such as a touch panel that receives an input through a touch operation. The input unit 303 is used to input each operation signal to the mobile terminal 30. The input unit 303 may include a microphone or the like and may receive voice input via the microphone or the like.

The display unit 304 is a display device such as a display, and displays a result or the like of processing performed by the mobile terminal 30. The input unit 303 and the display unit 304 may be, for example, a display input device having an input function and a display function, such as a touch panel display. The display input device is a liquid crystal display (LCD) or an organic electro luminescent (EL) display having a built-in touch panel sensor. The camera unit 305 is an imaging device including an imaging element, an image processing device, and the like.

The position information acquisition unit 306 generates position information by receiving a positioning signal included in radio waves transmitted from the GPS satellite 32, and outputs the generated position information. The speaker unit 307 is a voice circuit that generates a voice signal, and a voice output device that converts the voice signal into voice and outputs the voice.

The communication unit 308 is a communication interface for connecting the mobile terminal 30 to the network N via the base station 31. The communication unit 308 is a wireless communication device that connects the mobile terminal 30 to the network N via a mobile communication network such as Long Term Evolution (LTE), and includes an antenna, a wireless transmission/reception circuit, a communication control circuit, and the like. The communication unit 308 performs communication with the information processing server 10 and the like.

Figure 4:
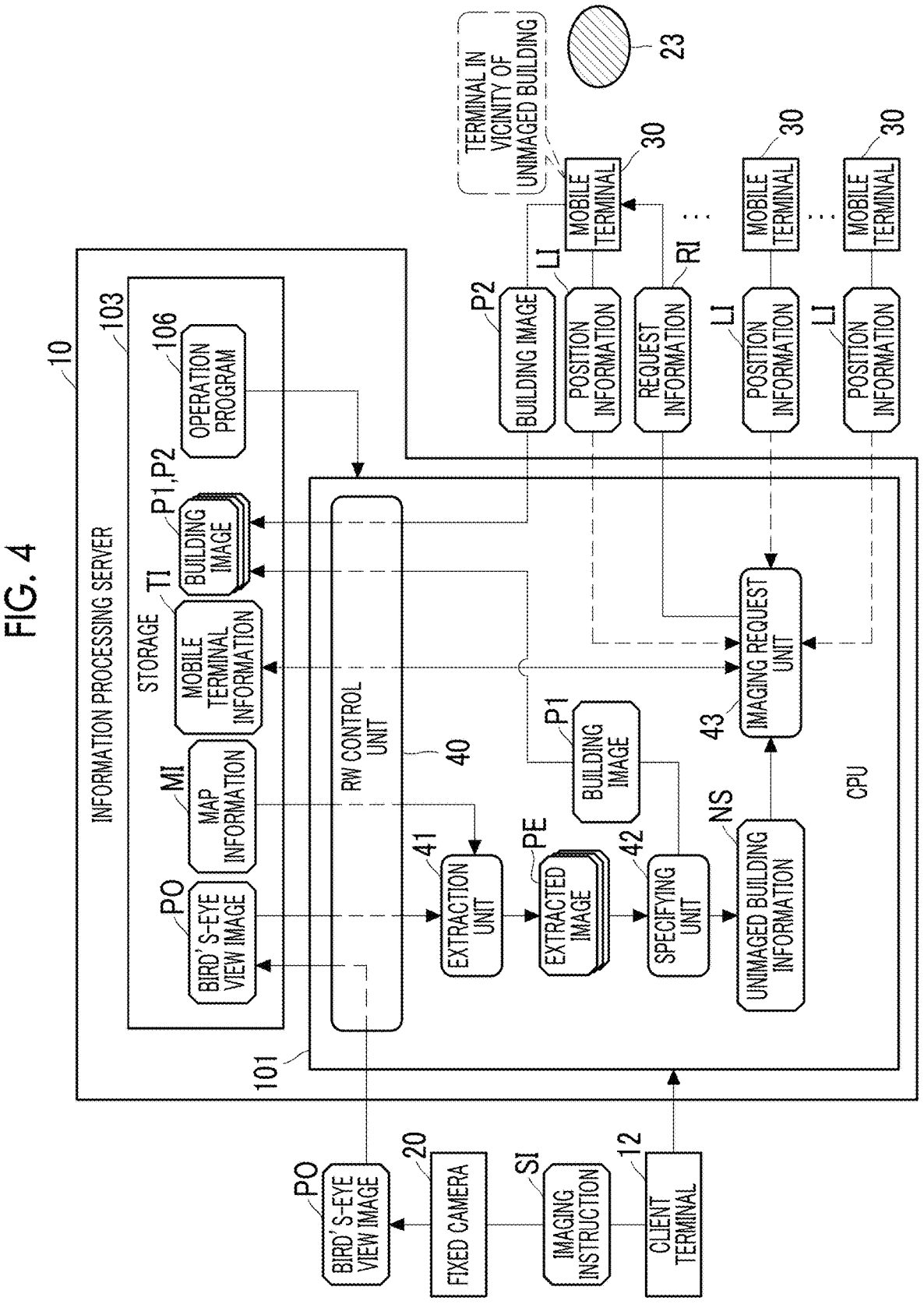
FIG. 4 is a block diagram showing an example of a functional configuration of the information processing server.

FIG. 4 shows an example of a functional configuration of the information processing server 10. In a case where the operation program 106 is started, the CPU 101 of the computer configuring the information processing server 10 functions as a read/write (RW) control unit 40, an extraction unit 41, a specifying unit 42, and an imaging request unit 43 in cooperation with the memory 102 or the like.

Figure 5:
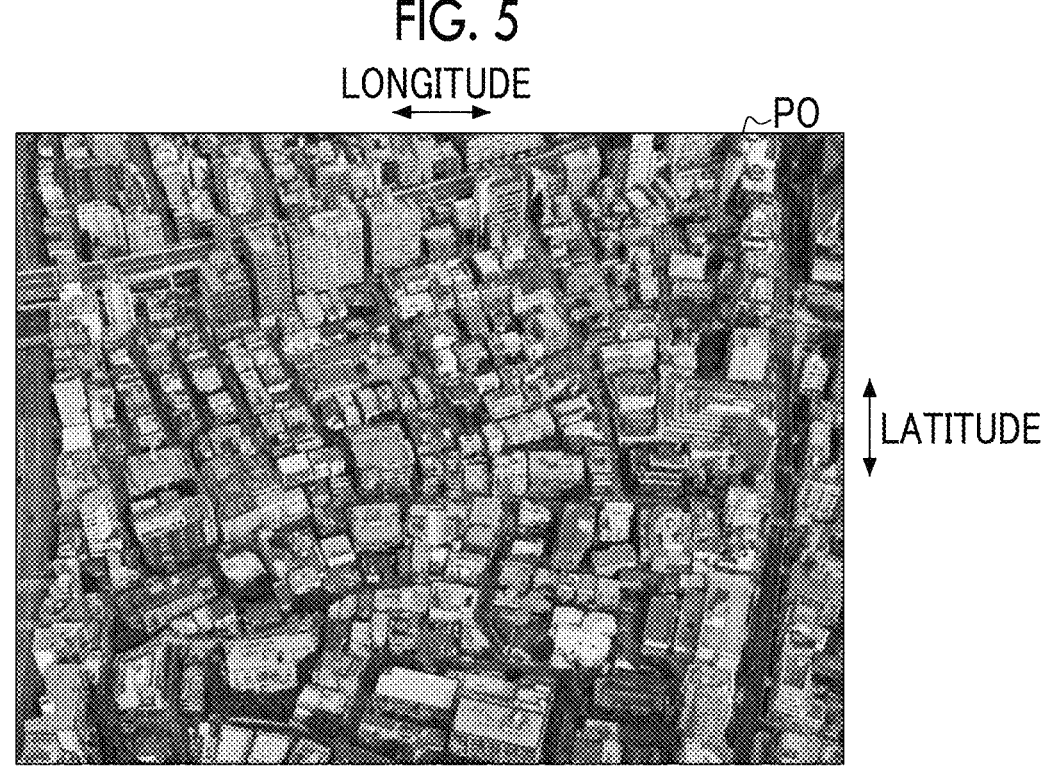
FIG. 5 is a diagram showing an example of a bird's-eye view image.

The RW control unit 40 controls storage of various types of data in the storage 103 and reading-out of various types of data from the storage 103. For example, the RW control unit 40 performs an acquisition process of acquiring a bird's-eye view image PO captured by the fixed camera 20, and stores the acquired bird's-eye view image PO in the storage 103. The fixed camera 20 captures an image of the city area 22 in response to an imaging instruction SI transmitted from the client terminal 12, and transmits the bird's-eye view image PO obtained by performing imaging to the information processing server 10. FIG. 5 shows an example of the bird's-eye view image PO.

Figure 6:
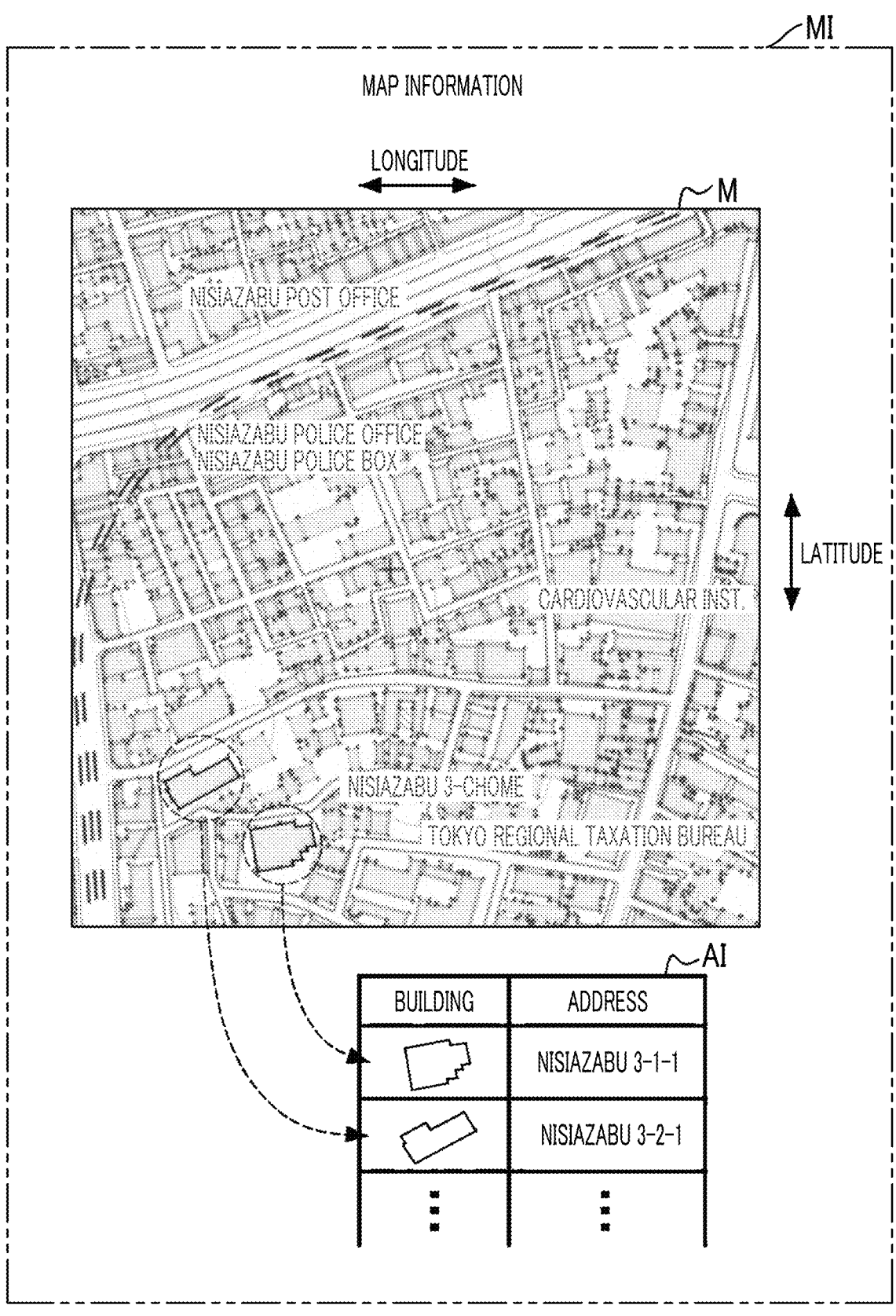
FIG. 6 is a diagram showing an example of map information.

The storage 103 stores in advance map information MI corresponding to the bird's-eye view image PO captured by the fixed camera 20. FIG. 6 shows an example of the map information MI. The map information MI includes a map M and address information AI. The map M is, for example, a two-dimensional residential map corresponding to a region of the city area 22 imaged by the fixed camera 20. The address information AI is information in which buildings and their addresses are associated with each other for all the buildings present in the map M.

The RW control unit 40 reads out the bird's-eye view image PO from the storage 103 and outputs the read-out bird's-eye view image PO to the extraction unit 41. The RW control unit 40 reads out the map information MI from the storage 103 and outputs the read-out map information MI to the extraction unit 41.

The extraction unit 41 performs an extraction process of individually extracting an image of a building corresponding to each address in the bird's-eye view image PO from the bird's-eye view image PO on the basis of the map information MI. The extraction unit 41 outputs an extracted image PE that has been extracted to the specifying unit 42. The extracted image PE is stored in the storage 103 via the RW control unit 40. The extracted image PE is attached with the address information of the building.

On the basis of the extracted image PE extracted by the extraction unit 41, the specifying unit 42 performs a specifying process of specifying an unimaged building that is not captured in the bird's-eye view image PO among the buildings included in the map information MI. The specifying unit 42 generates information (hereinafter, referred to as unimaged building information) NS representing the specified unimaged building, and outputs the generated unimaged building information NS to the imaging request unit 43. For example, in a case where the extracted image PE includes a contour of a building, the specifying unit 42 outputs the extracted image PE as the building image P1 to the storage 103 via the RW control unit 40. In a case where the extracted image PE does not include a contour of a building, the specifying unit 42 specifies the building at the address where the extracted image PE is extracted as an unimaged building.

The imaging request unit 43 performs an imaging request process of specifying the mobile terminal 30 present in the vicinity of the unimaged building on the basis of the position information LI transmitted from each of the plurality of mobile terminals 30, and transmitting the request information RI to the specified mobile terminal 30. The vicinity of the unimaged building is, for example, within a range of a certain radius centered on the place of the unimaged building (for example, a range of a radius of 100 meters). The imaging request unit 43 generates, for example, screen data to be displayed on the display unit 304 of the mobile terminal 30 as the request information RI on the basis of the unimaged building information NS. The request information RI includes the address of the unimaged building and the like. For example, an application program for displaying the request information RI on the display unit 304 is preinstalled in the mobile terminal 30.

In a case where unimaged buildings are present at a plurality of locations in the bird's-eye view image PO, the imaging request unit 43 transmits the request information RI to the mobile terminal 30 present in the vicinity of each of the unimaged buildings. The imaging request unit 43 may transmit the request information RI to a plurality of mobile terminals 30 for one unimaged building.

The storage 103 stores mobile terminal information TI for communicating with each of the mobile terminals 30 individually. The mobile terminal information TI includes a telephone number, an e-mail address, and the like. The imaging request unit 43 refers to the mobile terminal information TI, and transmits the request information RI to the target mobile terminal 30 by Short Message Service (SMS), e-mail, or the like.

The request information RI is displayed on the display unit 304 of the mobile terminal 30 present in the vicinity of the unimaged building by the owner performing a predetermined operation. For example, the request information RI is displayed on the display unit 304 by pressing a link described in a message transmitted from the imaging request unit 43. The owner of the mobile terminal 30 may image the unimaged building according to the request information RI. In a case where the unimaged building is imaged by the mobile terminal 30, an image P2 of the unimaged building (that is, a building image) is transmitted to the information processing server 10. Upon receiving the building image P2 from the mobile terminal 30, the information processing server 10 stores the received building image P2 in the storage 103 via the RW control unit 40.

Figure 7:
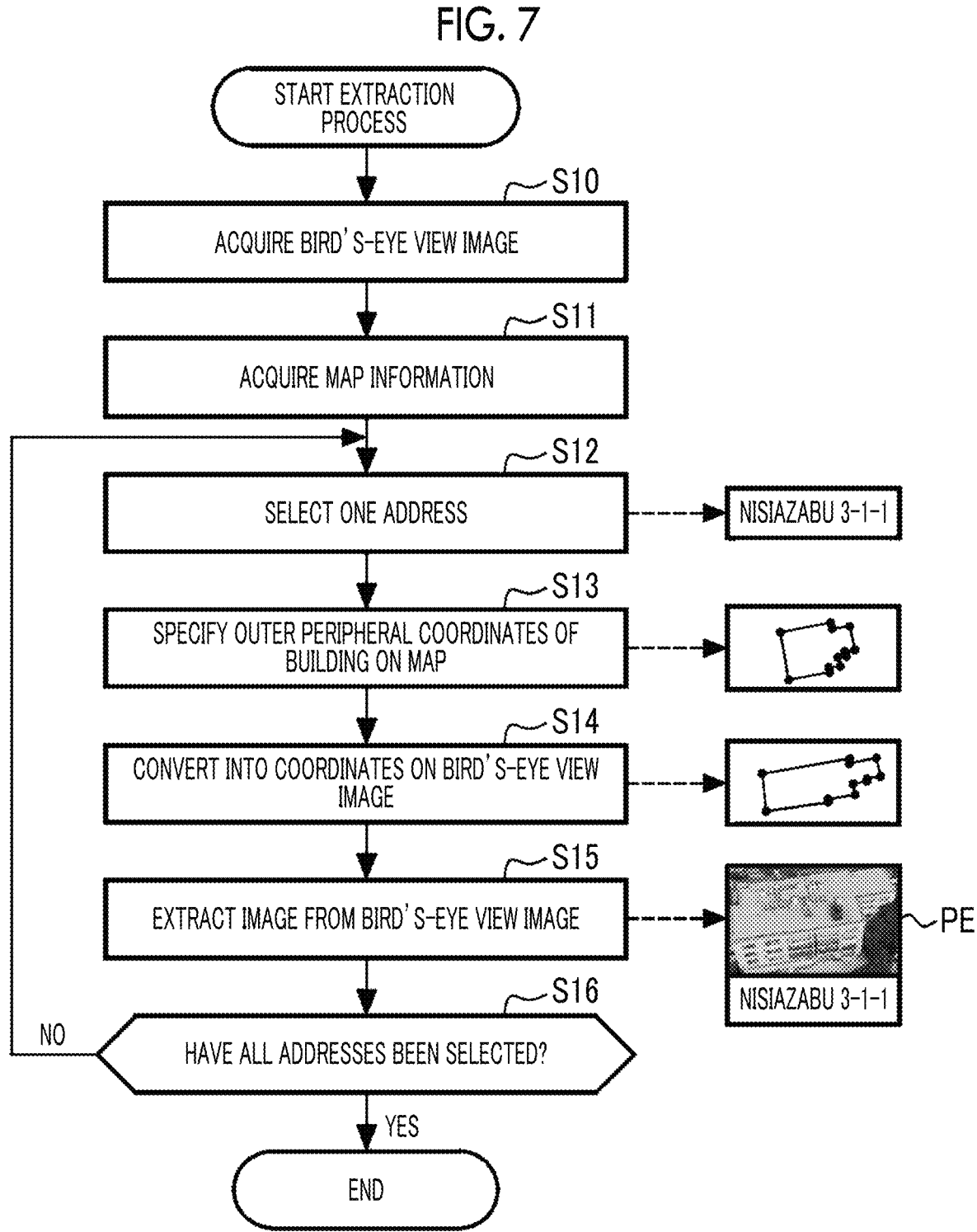
FIG. 7 is a flowchart for describing an example of an extraction process.

FIG. 7 is a diagram for describing an example of the extraction process performed by the extraction unit 41. As shown in FIG. 7, first, the extraction unit 41 acquires the bird's-eye view image PO from the storage 103 via the RW control unit 40 (step S10). Next, the extraction unit 41 acquires the map information MI from the storage 103 via the RW control unit 40 (step S11).

Next, the extraction unit 41 selects one address included in the map information MI (step S12). Next, the extraction unit 41 specifies coordinates of the outer periphery of a building (hereinafter, referred to as outer peripheral coordinates) present at the selected address on the map M (step S13). The outer peripheral coordinates are, for example, latitude and longitude information representing the position of the outer periphery of the building on the map M. Next, the extraction unit 41 converts the outer peripheral coordinates on the map M into coordinates on the bird's-eye view image PO (step S14). The extraction unit 41 extracts an image from the bird's-eye view image PO on the basis of the converted coordinates (step S15). In this case, for example, the extraction unit 41 sets a rectangular region to include the converted outer peripheral coordinates on the bird's-eye view image PO, and extracts the image from the set rectangular region.

Thereafter, the extraction unit 41 determines whether or not all addresses included in the map information MI have been selected (step S16). In a case where it is determined that all the addresses have not been selected (step S16: NO), the extraction unit 41 returns the process to step S12 and selects another address. The extraction unit 41 repeatedly executes the processes from step S12 to step S16 until it is determined that all the addresses have been selected in step S16. In a case where it is determined that all the addresses have been selected (step S16: YES), the extraction unit 41 ends the process.

Through the above process, the extraction unit 41 extracts images of buildings corresponding to all the addresses included in the map information MI from the bird's-eye view image PO.

Figure 8:
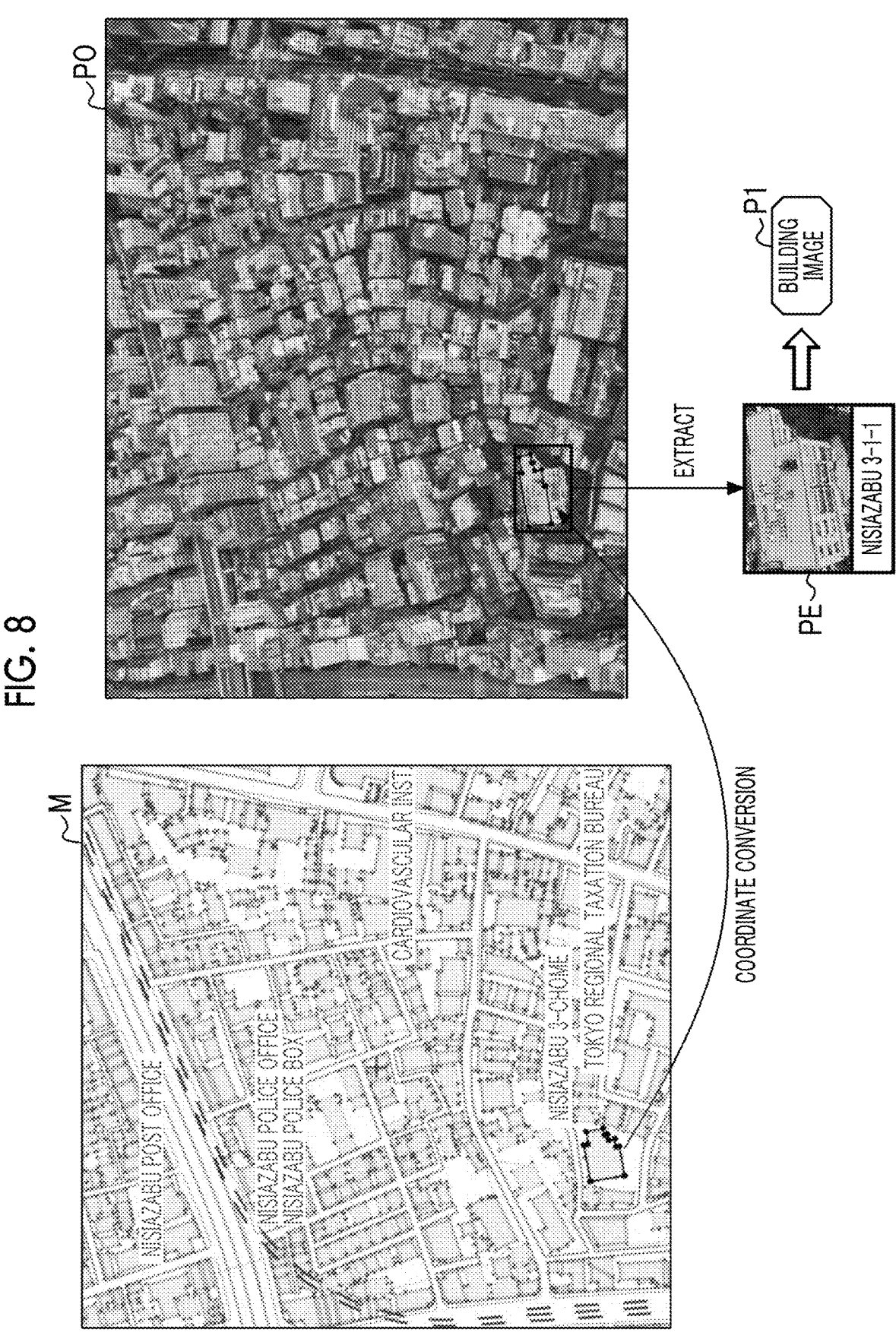
FIG. 8 is a diagram showing an example of an extracted image that is extracted through the extraction process.

FIG. 8 shows an example of the extracted image PE extracted through the extraction process. As shown in FIG. 8, outer peripheral coordinates of one building on the map M are converted into coordinates on the bird's-eye view image PO. An image is extracted from a region including a building represented by the coordinate-converted outer peripheral coordinates on the bird's-eye view image PO. In this example, a contour of the building present at the selected address is captured in the extracted image PE. Here, the contour of the building is, for example, a line representing the outer periphery of the building.

Figure 9:
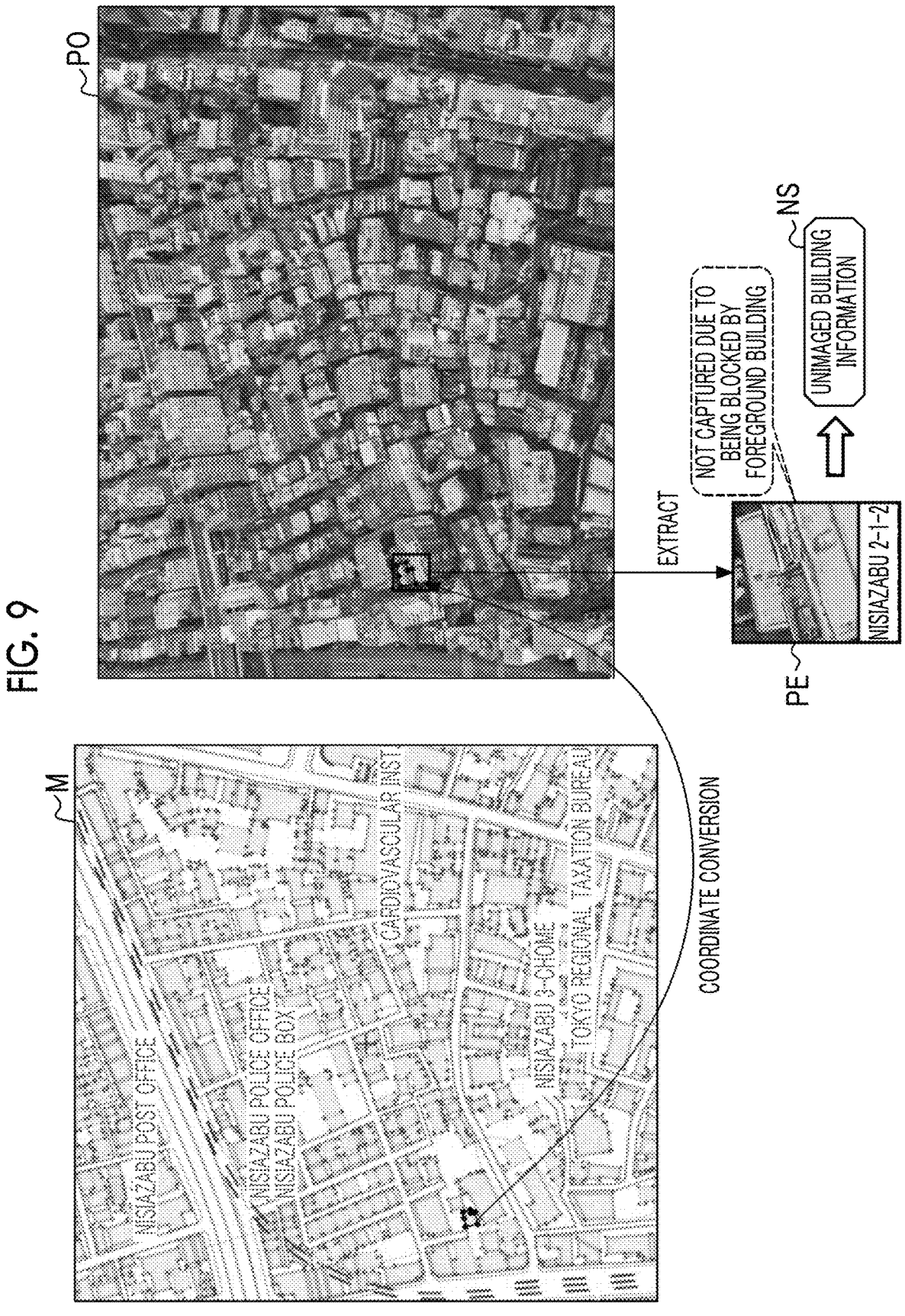
FIG. 9 is a diagram showing another example of the extracted image that is extracted through the extraction process.

FIG. 9 shows another example of the extracted image PE extracted through the extraction process. FIG. 9 shows the extracted image PE extracted from an address different from that in FIG. 8. In this example, the contour of the building present at the address selected by the extraction unit 41 is blocked by another building present in the foreground and thus is not captured in the extracted image PE (that is, not captured in the bird's-eye view image PO). As described above, among the buildings present at the addresses selected by the extraction unit 41, a building that is not captured in the bird's-eye view image PO is specified as an unimaged building by the specifying unit 42.

The building present at the address selected by the extraction unit 41 may not be captured in the bird's-eye view image PO and specified as an unimaged building not only in a case where the building is blocked by another building but also in a case where the building is blocked by an obstacle such as smoke generated at the time of a fire.

FIG. 10 is a diagram for describing an example of the specifying process performed by the specifying unit 42. As shown in FIG. 10, first, the specifying unit 42 acquires one extracted image PE among a plurality of extracted images PE extracted by the extraction unit 41 (step S20). Next, the specifying unit 42 determines whether or not a structure in the acquired extracted image PE is a building (step S21). For example, the specifying unit 42 determines whether or not the structure in the extracted image PE is a building on the basis of whether or not the extracted image PE includes the contour of the building.

In a case where it is determined that the structure in the extracted image PE is a building (step S21: YES), the specifying unit 42 stores the extracted image PE as a building image P1 in the storage 103 (step S22). On the other hand, in a case where it is determined that the structure in the extracted image PE is not a building (step S21: NO), the specifying unit 42 specifies the building at the address where the extracted image PE is extracted as an unimaged building (step S23).

The specifying unit 42 determines whether or not all the extracted images PE extracted by the extraction unit 41 have been acquired (step S24). In a case where it is determined that all the extracted images PE have not been acquired (step S24: NO), the specifying unit 42 returns the process to step S20 and acquires another extracted image PE. The specifying unit 42 repeatedly executes the processes from step S20 to step S24 until it is determined that all the extracted images PE have been acquired in step S24. In a case where it is determined that all the extracted images PE have been acquired (step S24: YES), the specifying unit 42 generates unimaged building information NS and outputs the generated unimaged building information NS to the imaging request unit 43 (step S25). Through the above processes, the specifying process is ended.

FIG. 11 shows an example of a configuration of the specifying unit 42. The specifying unit 42 has a structure determination model 42A that determines whether or not a structure captured in the extracted image PE is a building. The structure determination model 42A is a machine learning model constructed according to a method such as a neural network, a support vector machine, or boosting. The structure determination model 42A is stored in the storage 103, is read out from the storage 103 by the RW control unit 40, and is output to the specifying unit 42. The structure determination model 42A is an example of a "trained model" according to the technology of the present disclosure.

The specifying unit 42 inputs the extracted image PE to the structure determination model 42A. The structure determination model 42A determines whether or not the extracted image PE includes a contour of a building (that is, whether or not a structure is a building), and outputs a determination result JR. The specifying unit 42 generates the unimaged building information NS representing the address of the unimaged building on the basis of the determination result JR output from the structure determination model 42A. The unimaged building information NS includes address information attached to the extracted image PE in which it is determined that the contour of the building is not included (that is, the structure is not a building).

Figures 12, 13:
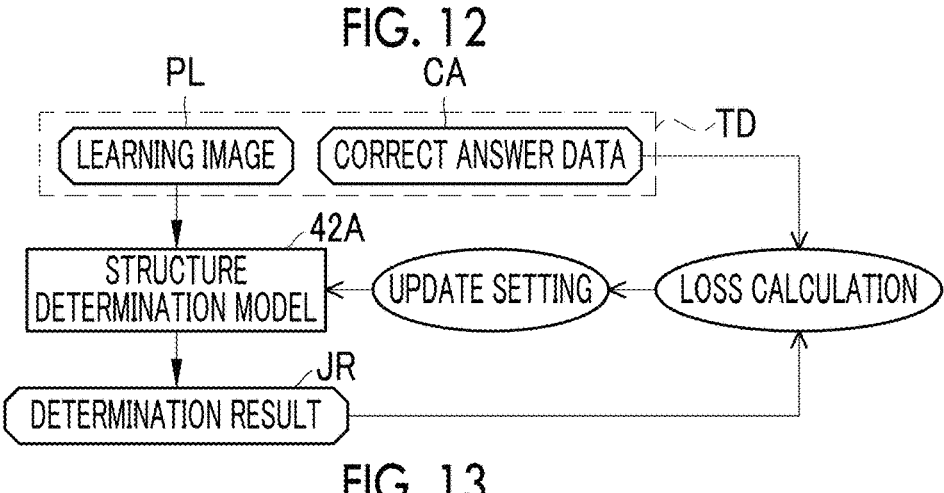
FIG. 12 is a diagram for describing a learning phase.
FIG. 13 is a diagram showing an example of unimaged building information.

FIG. 12 is a diagram for describing a learning phase in which the structure determination model 42A is trained by machine learning. The structure determination model 42A is trained by using training data TD. The training data TD includes a learning image PL and correct answer data CA. The learning image PL includes an image including the contour of the building and an image not including the contour of the building. The correct answer data CA is data indicating a correct answer to whether or not the learning image PL includes the contour of the building.

In the learning phase, the learning image PL is input to the structure determination model 42A. The structure determination model 42A outputs the determination result JR for the learning image PL. A loss calculation is performed by using a loss function on the basis of the determination result JR and the correct answer data CA. Update setting of various coefficients of the structure determination model 42A is performed according to a result of the loss calculation, and the structure determination model 42A is updated according to the update settings.

In the learning phase of the structure determination model 42A, a series of processes such as input of the learning image PL to the structure determination model 42A, output of the determination result JR from the structure determination model 42A, a loss calculation, update setting, and update of the structure determination model 42A is repeatedly performed. The repetition of this series of processes is ended in a case where the discrimination accuracy reaches a predetermined set level. The structure determination model 42A in which the determination accuracy reaches the set level is stored in the storage 103 and used by the specifying unit 42.

The learning image PL is, for example, an image of each building extracted from the bird's-eye view image PO. The correct answer data CA is, for example, a result of a person visually determining whether or not a contour of a building is included in the learning image PL. The learning image PL may be an image extracted from a bird's-eye view image of a city area different from the city area 22 captured by the fixed camera 20. The learning image PL may be an image extracted from bird's-eye view images of the same city area captured under various conditions in which the date and time, the weather, and the like are different.

FIG. 13 shows an example of the unimaged building information NS. For example, the unimaged building information NS is information representing an area 50 in which an unimaged building is present on the map M. For example, a plurality of areas 50 are present on the map M.

Figure 14:
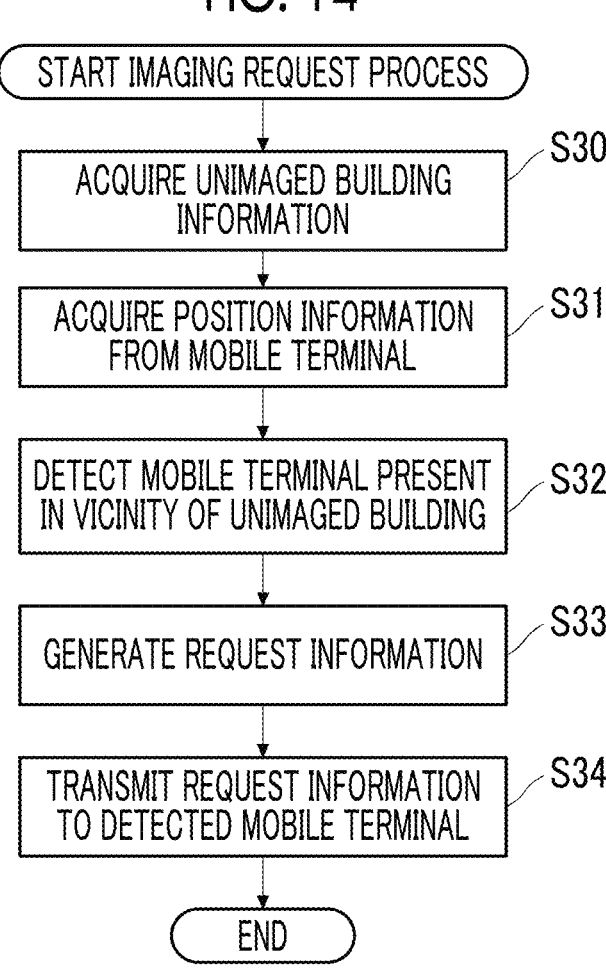
FIG. 14 is a flowchart for describing an example of an imaging request process.

FIG. 14 is a diagram for describing an example of an imaging request process performed by the imaging request unit 43. As shown in FIG. 14, the imaging request unit 43 acquires the unimaged building information NS from the specifying unit 42 (step S30). In order to acquire the unimaged building information NS, the imaging request unit 43 acquires the position information from each of the plurality of mobile terminals 30 present on the map M (step S31). The imaging request unit 43 detects the mobile terminal 30 present in the vicinity of the unimaged building on the basis of the unimaged building information NS and the position information of the mobile terminal 30 (step S32).

Next, the imaging request unit 43 generates the request information RI on the basis of the unimaged building information NS (step S33). Specifically, the imaging request unit 43 generates individual request information RI for each of the detected mobile terminals 30. The imaging request unit 43 refers to the mobile terminal information TI stored in the storage 103, and transmits the request information RI to the detected mobile terminal 30 by SMS, e-mail, or the like (step S34). Through the above processes, the imaging request process is ended.

Figure 15:
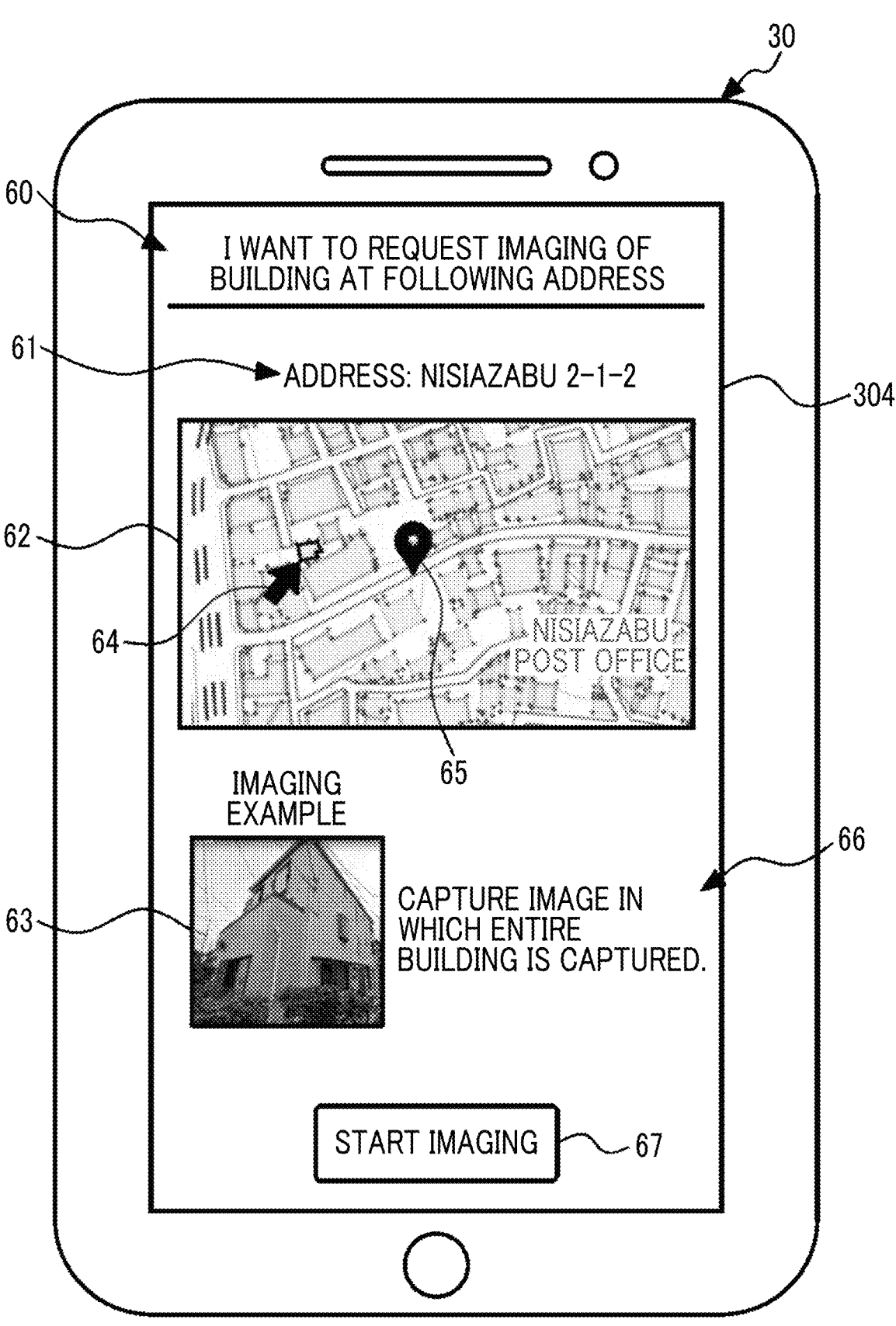
FIG. 15 is a diagram showing an example of request information displayed on a display unit of the mobile terminal.

FIG. 15 shows an example of the request information RI displayed on the display unit 304 of the mobile terminal 30. The request information RI is displayed on the display unit 304 by the owner of the mobile terminal 30 that has received the request information RI operating the input unit 303.

For example, the request information RI includes a message 60 for prompting imaging of the unimaged building, an address 61 of the unimaged building, a map 62 indicating a position of the unimaged building, and a sample image 63 representing an example of an image to be captured.

For example, an arrow 64 indicating the position of the unimaged building is displayed on the map 62. A current location mark 65 indicating a current location of the mobile terminal 30 is displayed on the map 62. The owner of the mobile terminal 30 can ascertain the location of the unimaged building on the basis of the address 61 and the map 62. The map 62 may be updated at any time from the map data on the Internet in response to movement of the mobile terminal 30.

It is preferable that the entire building is captured in the sample image 63. It is also preferable to display a plurality of sample images 63 on the display unit 304. It is preferable that the sample image 63 includes all walls of the building in four directions. It is also preferable that the display unit 304 displays precautions 66 for imaging together with the sample image 63.

The display unit 304 displays an execution button 67 for starting imaging. The owner of the mobile terminal 30 can press the execution button 67 to activate the camera unit 305 (refer to FIG. 3) and start imaging the unimaged building. A building image P2 of the unimaged building captured by the mobile terminal 30 is transmitted to the information processing server 10 and stored in the storage 103.

In the information collection system 2 configured as described above, for example, immediately after the occurrence of a disaster, a staff member of the local government operates the client terminal 12 to start an information collecting process. In this case, the bird's-eye view image PO is an image including a disaster occurrence area. The staff member of the local government can check the collected building images P1 and P2 on the client terminal 12.

According to the technology of the present disclosure, the building image P1 of each building captured in the bird's-eye view image PO is collected from the bird's-eye view image PO, and the building image P2 of the unimaged building not captured in the bird's-eye view image PO is collected by being captured by the mobile terminal 30 present in the vicinity of the unimaged building. Therefore, according to the technology of the present disclosure, it is possible to quickly ascertain a damage status of a building that is not captured in the bird's-eye view image PO.

The information collection system 2 may acquire the unimaged building information NS by executing the information collecting process in a normal time in which a disaster does not occur. In this case, since the unimaged building information NS is acquired in advance before the occurrence of the disaster, it is possible to promptly request imaging of the unimaged building after the occurrence of the disaster. It is also preferable that the information collection system 2 periodically executes the information collecting process in a normal time in which a disaster does not occur, and thus updates the unimaged building information NS to the latest information at any time. Thus, it is possible to quickly respond to a change in the unimaged building information NS due to new construction, dismantling, or the like of the building.

Second Embodiment

Next, a second embodiment will be described. In the first embodiment, the map M included in the map information MI is a two-dimensional plane map, but in the second embodiment, the map M is a three-dimensional stereoscopic map in which a building is represented by polygons.

Figure 16:
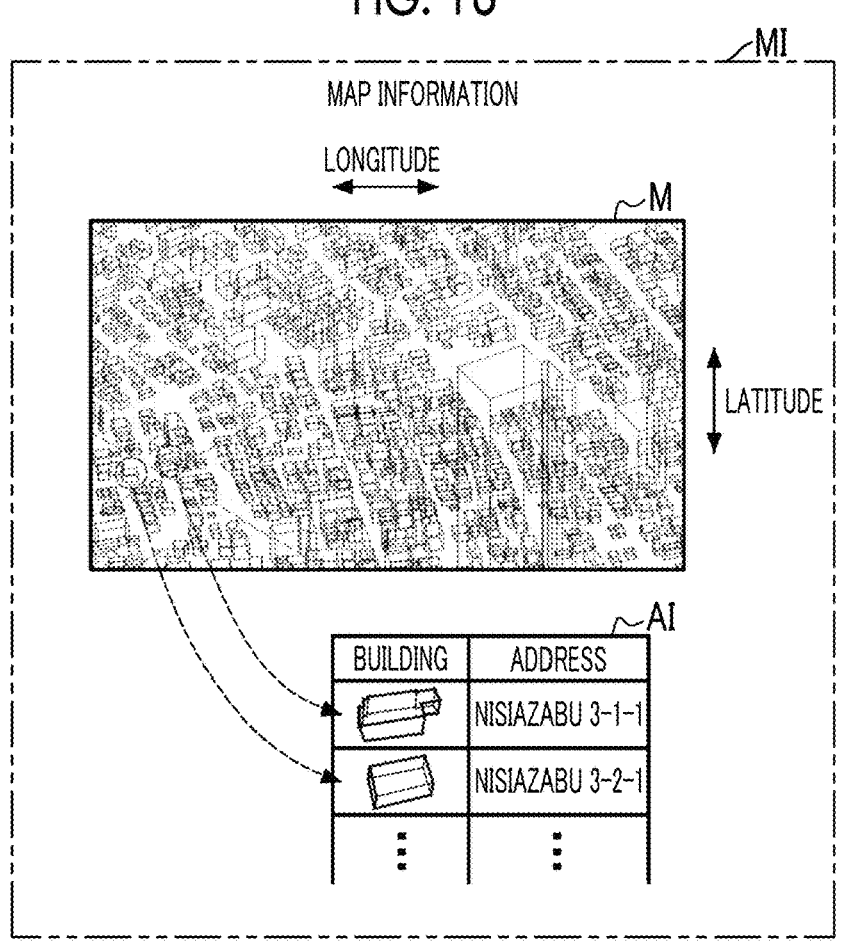
FIG. 16 is a diagram showing an example of map information according to a second embodiment.

FIG. 16 shows an example of the map information MI according to the second embodiment. In the map M included in the map information MI, a building represented by a polygon image is recorded in association with an address. In the same manner as in the first embodiment, the address information AI is information in which buildings and their addresses are associated with each other for all the buildings present in the map M.

In the present embodiment, configurations of the extraction unit 41 and the imaging request unit 43 are the same as those in the first embodiment, but a configuration of the specifying unit 42 is different from that in the first embodiment.

Figure 17:
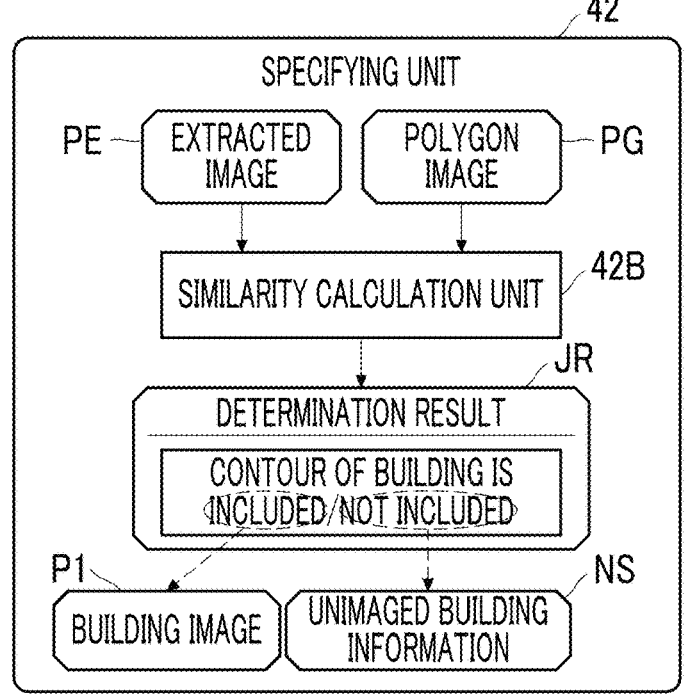
FIG. 17 is a block diagram showing an example of a configuration of a specifying unit according to the second embodiment.

FIG. 17 shows an example of a configuration of the specifying unit 42 according to the second embodiment. In the present embodiment, the specifying unit 42 performs determination by using a similarity calculation unit 42B instead of the structure determination model 42A. An extracted image PE and a polygon image PG corresponding to the extracted image PE are input to the similarity calculation unit 42B. In the map M, the polygon image PG is an image of a building corresponding to an address where the extracted image PE is extracted.

The similarity calculation unit 42B calculates the similarity between a contour of a structure captured in the extracted image PE and the polygon image PG. The specifying unit 42 determines whether or not the extracted image PE includes the contour of the building (that is, whether or not the structure is a building) on the basis of the similarity calculated by the similarity calculation unit 42B. The specifying unit 42 generates the unimaged building information NS representing the address of the unimaged building on the basis of the determination result JR.

The similarity calculation unit 42B calculates the similarity according to, for example, a pattern matching method. The similarity calculation unit 42B may calculate the similarity according to a method using machine learning such as a neural network.

Figure 18:
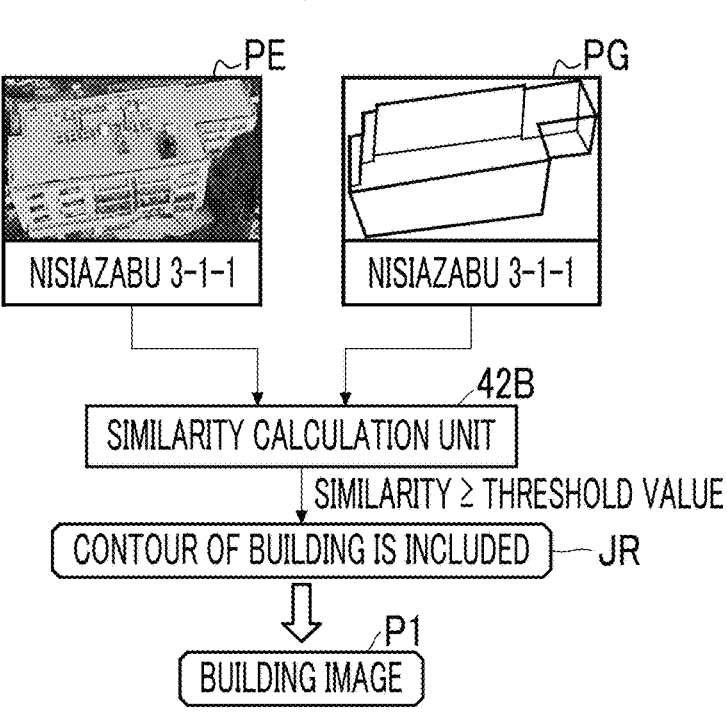
FIG. 18 is a diagram showing an example of determination using a similarity calculation unit.

FIG. 18 shows an example of determination using the similarity calculation unit 42B. Since the contour of the building is captured in the extracted image PE shown in FIG. 18, the similarity between the extracted image PE and the polygon image PG calculated by the similarity calculation unit 42B is equal to or more than a threshold value. In such a case where the similarity is equal to or more than the threshold value, the specifying unit 42 determines that the extracted image PE includes the contour of the building. In this case, the extracted image PE is stored in the storage 103 as the building image P1.

Figure 19:
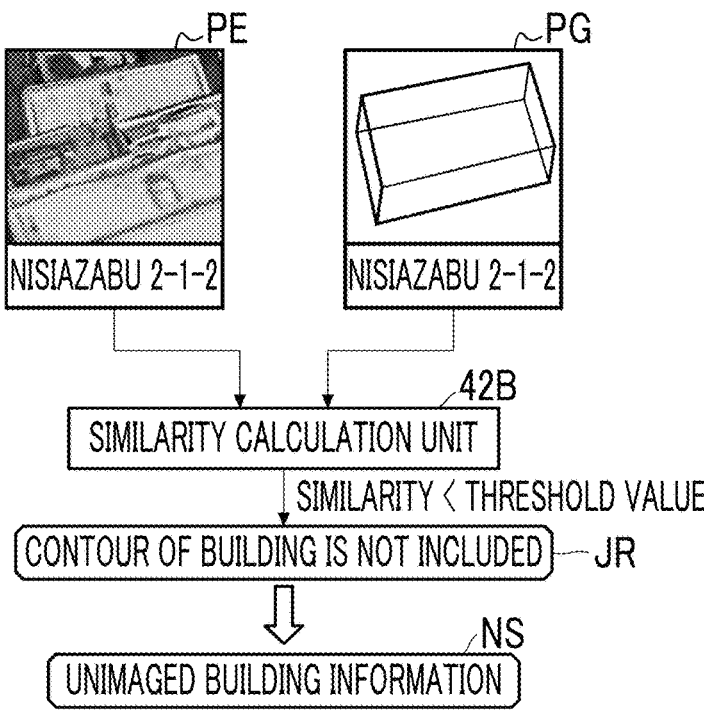
FIG. 19 is a diagram showing another example of determination using the similarity calculation unit.

FIG. 19 shows another example of determination using the similarity calculation unit 42B. Since the contour of the building is not completely captured in the extracted image PE shown in FIG. 19, the similarity between the extracted image PE and the polygon image PG calculated by the similarity calculation unit 42B is less than a threshold value. In such a case where the similarity is less than the threshold value, the specifying unit 42 determines that the extracted image PE does not include the contour of the building. In this case, the building at the address where the extracted image PE is extracted is specified as an unimaged building and is included in the unimaged building information NS.

Third Embodiment

Next, a third embodiment will be described. In the first embodiment, the extraction unit 41 extracts an image of a building corresponding to each address in the bird's-eye view image PO as the extracted image PE on the basis of the map information MI. In contrast, in the third embodiment, the extraction unit 41 extracts an image including an object having characteristics of a building from the bird's-eye view image PO as the extracted image PE without using the map information MI. In the present embodiment, the map information MI is used by the specifying unit 42.

Figure 20:
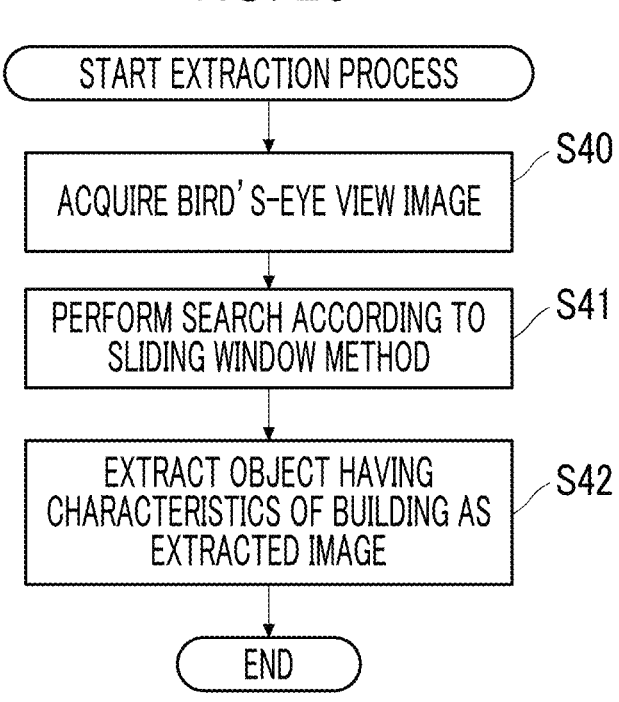
FIG. 20 is a flowchart for describing an example of an extraction process according to a third embodiment.

FIG. 20 is a diagram for describing an example of an extraction process performed by the extraction unit 41 according to the third embodiment. As shown in FIG. 20, first, the extraction unit 41 acquires the bird's-eye view image PO from the storage 103 (step S40). Next, the extraction unit 41 searches the bird's-eye view image PO for an object having characteristics of a building according to a sliding window method (step S41). The extraction unit 41 extracts the object having the characteristics of the building as the extracted image PE (step S42). Through the processes, the extraction process is ended.

Figure 21:
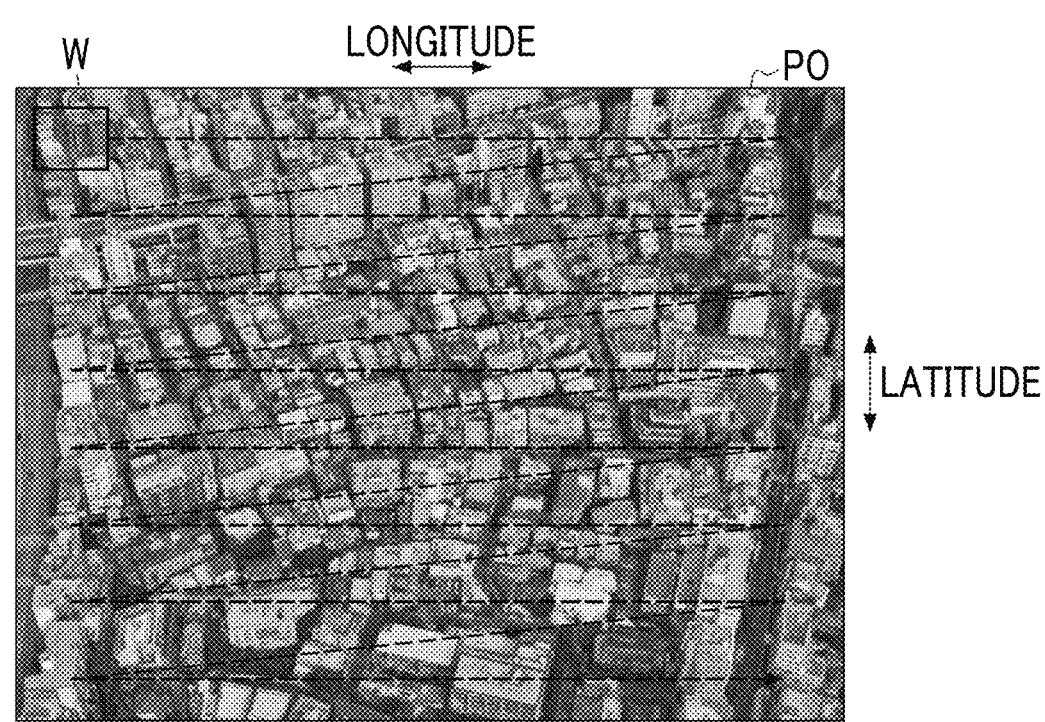
FIG. 21 is a diagram for schematically describing a sliding window method.

FIG. 21 is a diagram for schematically describing the sliding window method. The extraction unit 41 sets a window W in the bird's-eye view image PO, and detects an object having characteristics of a building on the basis of a feature amount of a structure included in the window W while changing a position of the window W. The extraction unit 41 searches for an object while changing a size and a shape of the window W in addition to the position of the window W.

The extraction unit 41 is configured by, for example, a convolutional neural network. The search according to the sliding window method may be performed on the basis of a feature map obtained by converting the bird's-eye view image PO with a convolution layer.

Figure 22:
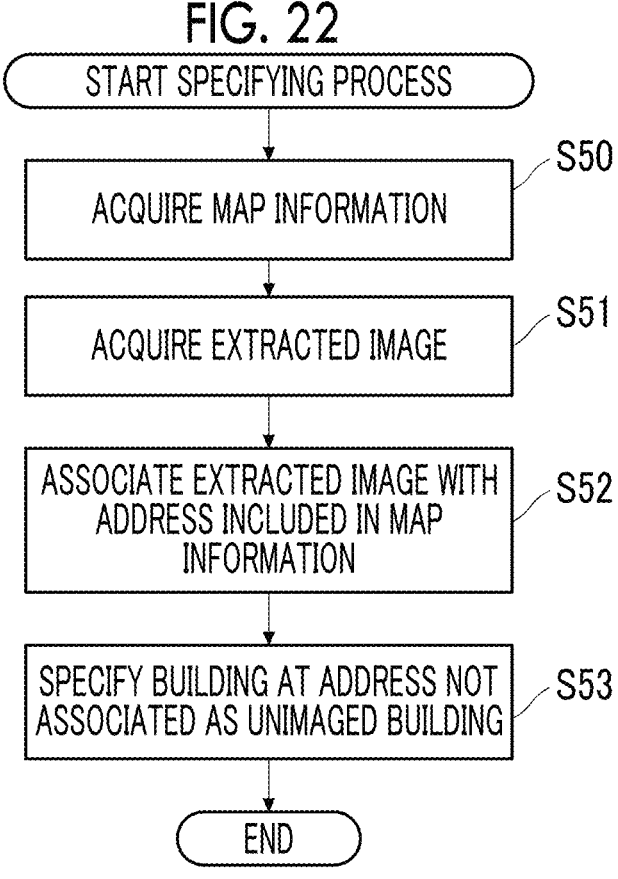
FIG. 22 is a flowchart for describing a specifying process according to the third embodiment.

FIG. 22 is a diagram for describing a specifying process performed by the specifying unit 42 according to the third embodiment. As shown in FIG. 22, first, the specifying unit 42 acquires the map information MI from the storage 103 (step S50). Next, the specifying unit 42 acquires the extracted image PE extracted by the extraction unit 41 (step S51). The specifying unit 42 associates the acquired extracted image PE with an address included in the map information MI (step S52). Here, the specifying unit 42 associates all the extracted images PE acquired from the extraction unit 41 with addresses included in the map information MI.

The specifying unit 42 specifies, among the addresses of the buildings included in the map information MI, a building at an address with which the extracted image PE is not associated as an unimaged building (step S53). Through the above processes, the specifying process is ended.

Figure 23:
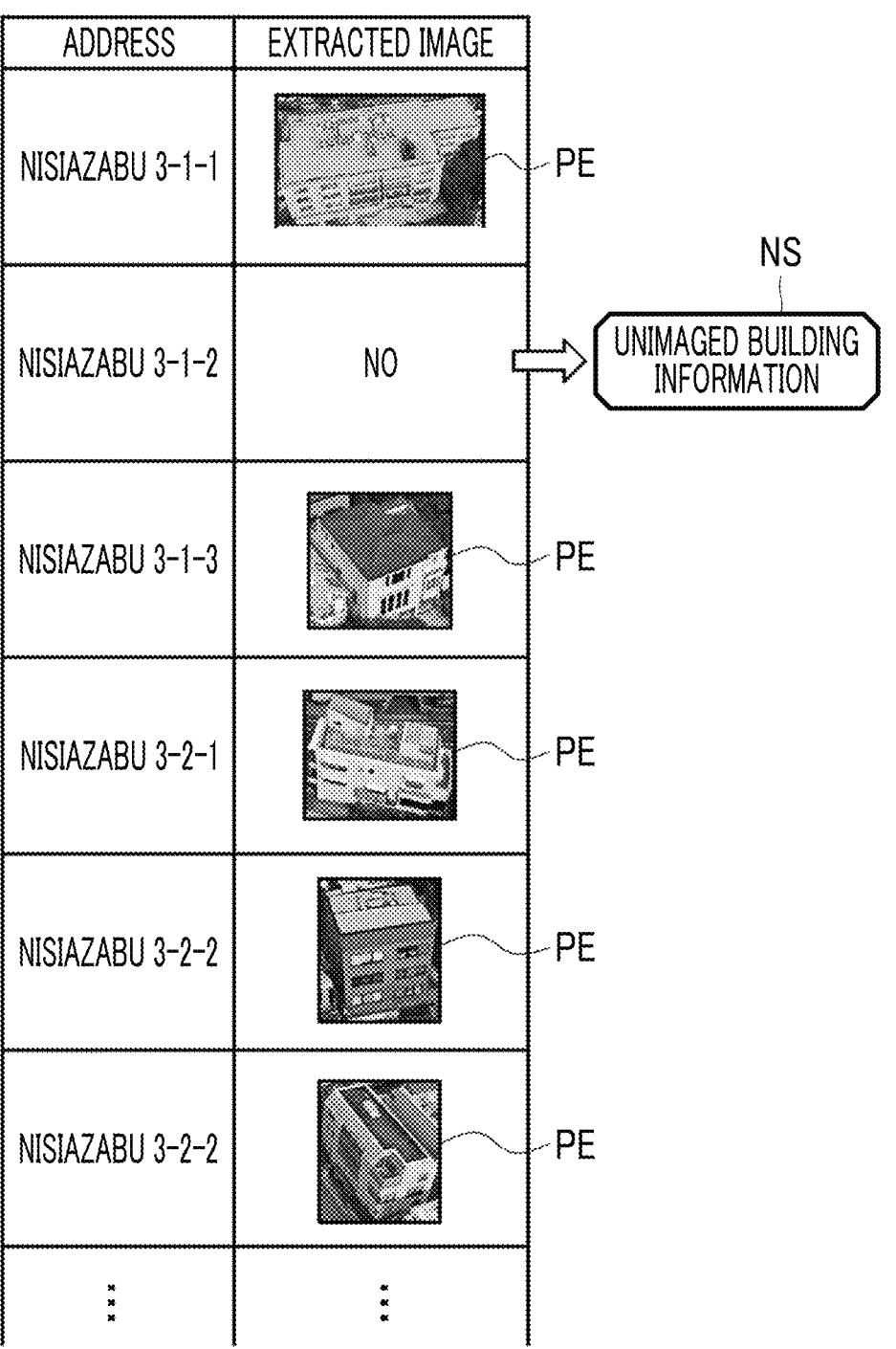
FIG. 23 is a diagram for schematically describing a specifying process according to the third embodiment.

FIG. 23 is a diagram for schematically describing the specifying process according to the third embodiment. As shown in FIG. 23, the extracted image PE extracted from the bird's-eye view image PO is associated with the address included in the map information MI through the specifying process as an image including an object having characteristics of a building. After all the extracted images PE extracted from the bird's-eye view image PO are associated with the addresses, a building at an address not associated is specified as an unimaged building.

[Conversion of Outer Peripheral Coordinates]

Figure 24:
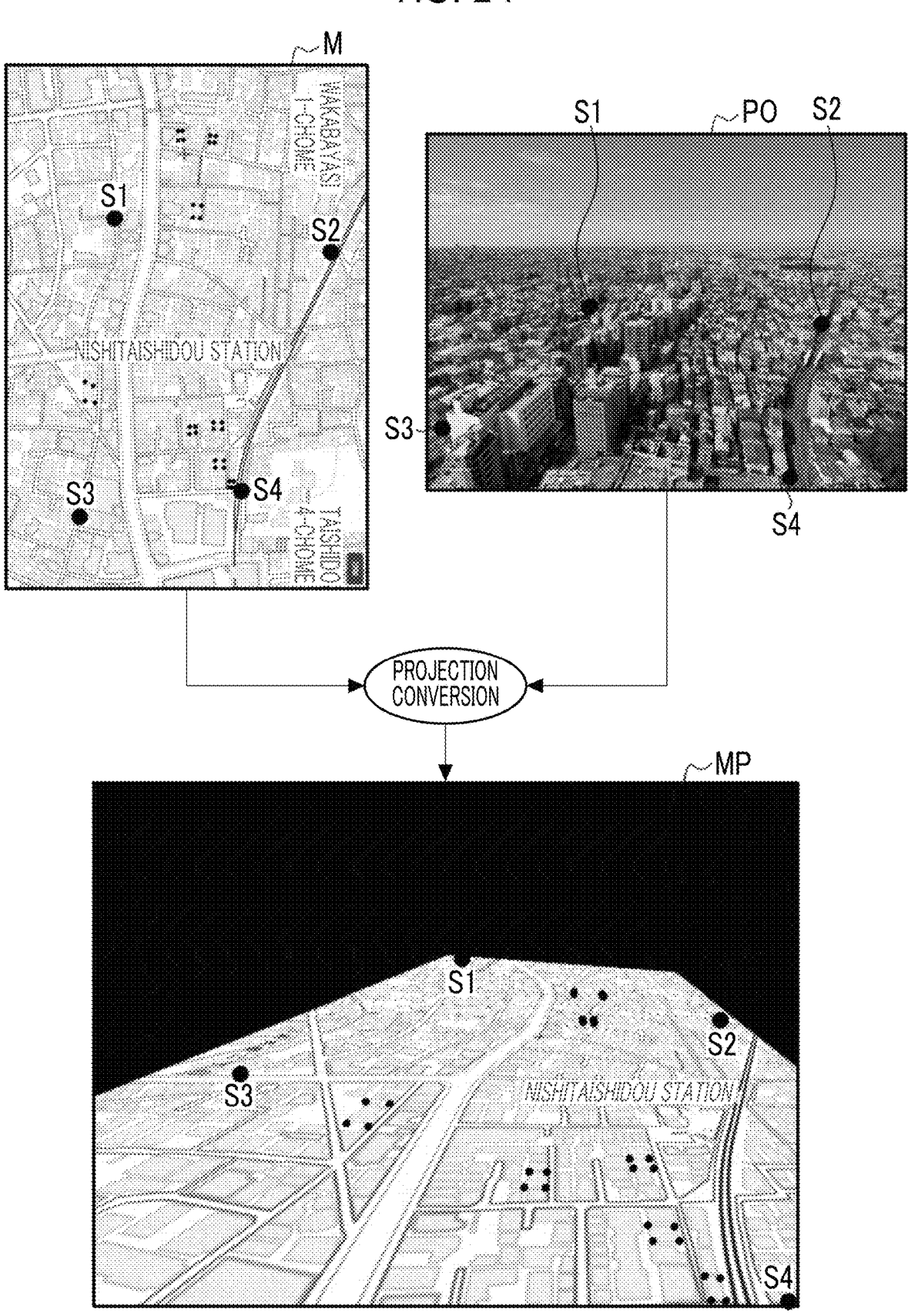
FIG. 24 is a diagram showing an example of coordinate conversion of outer peripheral coordinates.

Next, coordinate conversion of outer peripheral coordinates of a building executed in the extraction process will be described. FIG. 24 shows an example of coordinate conversion of outer peripheral coordinates. In this example, the map M is a two-dimensional plane map.

First, four corresponding points S1 to S4 are set in the map M and the bird's-eye view image PO. These four points S1 to S4 may be set manually, or may be set through image processing or the like. Next, a projection conversion matrix is obtained on the basis of coordinates on the map M and coordinates on the bird's-eye view image PO of the four corresponding points S1 to S4.

A map MP is a map obtained by performing projection conversion of the map M by using the projection conversion matrix. Outer peripheral coordinates of the building on the map MP correspond to outer peripheral coordinates on the bird's-eye view image PO. The extraction unit 41 may perform coordinate conversion of the outer peripheral coordinates of the building by using the projection conversion matrix.

In a case where the map M is a three-dimensional stereoscopic map, by obtaining a parameter having the highest degree of matching with the bird's-eye view image PO while changing parameters such as a line-of-sight direction and an angle of view of the stereoscopic map, it is possible to generate a projection-converted map similar to the map MP.

In a case where information regarding latitude, longitude, and height can be acquired for six points in the bird's-eye view image PO, it is possible to convert the bird's-eye view image PO into a planar image. Outer peripheral coordinates of a building in the bird's-eye view image PO may be obtained on the basis of the converted bird's-eye view image PO and the two-dimensional plane map M.

In each of the above-described embodiments, for example, as a hardware structure of a processing unit that executes various processes such as the RW control unit 40, the extraction unit 41, the specifying unit 42, and the imaging request unit 43, the following various processors may be used. In addition to the CPU 101 which is a general-purpose processor that executes software (operation program 106) to function as various processing units, as described above, the various processors include a programmable logic device (PLD) that is a processor of which a circuit configuration can be changed after being manufactured, such as a field programmable gate array (FPGA), and a dedicated electric circuit that is a processor having a circuit configuration exclusively designed to execute a specific process, such as an application specific integrated circuit (ASIC).

One processing unit may be configured with one of these various processors, or may be configured with a combination of two or more processors of the same type or a different type (for example, a combination of a plurality of FPGAs and/or a combination of a CPU and an FPGA). A plurality of processing units may be configured by one processor.

As an example of configuring a plurality of processing units with one processor, first, there is a form in which one processor is configured by a combination of one or more CPUs and software, as typified by a computer such as a client or a server, and this processor functions as a plurality of processing units. Second, as typified by a system on chip (SoC) or the like, there is a form in which a processor that realizes functions of the entire system including a plurality of processing units with one integrated circuit (IC) chip is used. As described above, the various processing units are configured by using one or more of the above various processors as a hardware structure.

As the hardware structure of these various processors, more specifically, an electric circuit (circuitry) in which circuit elements such as semiconductor elements are combined can be used.

The technology of the present disclosure can also be made by appropriately combining various embodiments and/or various modification examples described above. It goes without saying that the technology of the present disclosure is not limited to each of the above-described embodiments and various configurations can be employed without departing from the concept thereof. The present invention is applied not only to a program but also to a computer-readable storage medium storing the program in a non-transitory manner.

In the present specification, "A and/or B" is synonymous with "at least one of A or B". That is, "A and/or B" may be only A, only B, or a combination of A and B. In the present specification, in a case where three or more constituents are connected and expressed by "and/or", the same concept as "A and/or B" is applied.

The contents described and exemplified above are detailed descriptions of the portions related to the technology of the present disclosure, and are only an example of the technology of the present disclosure. For example, the above description of the configuration, the function, the operation, and the effect is an example of the configuration, the function, the operation, and the effect of the portions of the technology of the present disclosure. Therefore, needless to say, unnecessary portions may be deleted, new elements may be added, or replacements may be made to the described content and exemplified content described above within the scope without departing from the spirit of the technology of the present disclosure. In order to avoid complications and facilitate understanding of the portions related to the technology of the present disclosure, in the described content and the exemplified content described above, description of common technical knowledge or the like that does not require particular description in order to enable the implementation of the technology of the present disclosure is omitted.

All the documents, the patent applications, and the technical standards disclosed in the present specification are incorporated by reference in the present specification to the same extent as in a case where the individual documents, patent applications, and technical standards are specifically and individually stated to be incorporated by reference.

What is claimed is:

1. An information processing apparatus comprising:
a processor; and
a memory connected to or built into the processor,
wherein the processor is configured to
acquire a bird's-eye view image captured by a fixed camera,
analyze the bird's-eye view image and, for each image region estimated to be a building, individually extract the region from the bird's-eye view image as an extracted image,
compare the extracted image with buildings included in map information in which the buildings and their addresses are associated with each other and, based on the comparison, specify, among buildings included in the map information, a building that is not captured in the bird's-eye view image as an unimaged building, and
transmit, among a plurality of terminals having an imaging function and a function of transmitting position information, request information for requesting imaging of the unimaged building to a terminal that is determined as being present in the vicinity of the unimaged building on the basis of the position information.

2. The information processing apparatus according to claim 1,
wherein the extracted image is an image that is obtained by converting coordinates representing the outer periphery of a building at each address included in the map information to the coordinates on the bird's-eye view image, and extracting the area corresponding to the converted coordinates from the bird's-eye view image, and wherein the processor is configured to determine whether or not a structure captured in the extracted image extracted is a building, and in a case where the structure is not a building, specify a building at an address where the extracted image is extracted as the unimaged building.

3. The information processing apparatus according to claim 2, wherein the processor is configured to determine whether or not the structure is a building on the basis of a trained model that is trained by using training data indicating whether or not a structure is a building.

4. The information processing apparatus according to claim 2, wherein the map information includes a polygon image representing a contour of a building, and the processor is configured to determine whether or not the structure is a building on the basis of a similarity between a contour of the structure and the polygon image corresponding to the extracted image.

5. The information processing apparatus according to claim 1, wherein the extracted image is an image, which is extracted from the bird's-eye view image, that includes an object having characteristics of a building, and wherein the processor is configured to associate the extracted image that has been extracted with an address included in the map information, and specify a building at an address not associated with the extracted image as the unimaged building.

6. The information processing apparatus according to claim 1, wherein the request information includes a map indicating an address of the unimaged building.

7. The information processing apparatus according to claim 1, wherein the request information includes a sample image representing an example of an image to be captured.

8. An information processing method comprising:

acquiring a bird's-eye view image captured by a fixed camera;

analyzing the bird's-eye view image and, for each image region estimated to be a building, individually extracting the region from the bird's-eye view image as an extracted image;

comparing the extracted image with buildings included in map information in which the buildings and their respective addresses are associated with each other and, based on the comparison, specifying, among buildings included in the map information, a building that is not captured in the bird's-eye view image as an unimaged building; and transmitting, among a plurality of terminals having an imaging function and a function of transmitting position information, request information for requesting imaging of the unimaged building to a terminal that is determined as being present in the vicinity of the unimaged building on the basis of the position information.

9. A non-transitory computer-readable storage medium storing a program causing a computer to execute operations including:

acquiring a bird's-eye view image captured by a fixed camera;

analyzing the bird's-eye view image and, for each image region estimated to be a building, individually extracting the region from the bird's-eye view image as an extracted image;

comparing the extracted image with buildings included in map information in which the buildings and their respective addresses are associated with each other and, based on the comparison, specifying, among buildings included in the map information, a building that is not captured in the bird's-eye view image as an unimaged building; and transmitting, among a plurality of terminals having an imaging function and a function of transmitting position information, request information for requesting imaging of the unimaged building to a terminal that is determined as being present in the vicinity of the unimaged building on the basis of the position information.

10. An information collection system comprising:

a fixed camera that captures a bird's-eye view image;

an information processing apparatus that includes a processor; and a plurality of terminals having an imaging function and a function of transmitting position information, wherein the processor is configured to execute operations including:

acquiring the bird's-eye view image captured by the fixed camera, analyzing the bird's-eye view image and, for each image region estimated to be a building, individually extracting the region from the bird's-eye view image as an extracted image, comparing the extracted image with buildings included in map information in which the buildings and their respective addresses are associated with each other and, based on the comparison, specifying, among buildings included in the map information, a building that is not captured in the bird's-eye view image as an unimaged building, and transmitting, among a plurality of terminals having an imaging function and a function of transmitting position information, request information for requesting imaging of the unimaged building to a terminal that is determined as being present in the vicinity of the unimaged building on the basis of the position information.

* * * * *